US011867922B1

(12) United States Patent
Long

(10) Patent No.: US 11,867,922 B1
(45) Date of Patent: Jan. 9, 2024

(54) SYNCHRONOUS, TUNABLE MULTI-OPTICAL FILTER SYSTEM

(71) Applicant: Pin Long, LaSalle (CA)

(72) Inventor: Pin Long, LaSalle (CA)

( * ) Notice: Subject to any disclaimer, the term of this patent is extended or adjusted under 35 U.S.C. 154(b) by 147 days.

(21) Appl. No.: 17/721,383

(22) Filed: Apr. 15, 2022

(51) Int. Cl.
| | |
|---|---|
| G02B 27/42 | (2006.01) |
| G02B 27/12 | (2006.01) |
| G02B 27/30 | (2006.01) |
| H01S 3/00 | (2006.01) |
| G02B 27/14 | (2006.01) |
| G02B 27/09 | (2006.01) |

(52) U.S. Cl.
CPC ....... *G02B 27/4244* (2013.01); *G02B 27/126* (2013.01); *G02B 27/14* (2013.01); *G02B 27/30* (2013.01); *H01S 3/0078* (2013.01); *G02B 27/0966* (2013.01); *H01S 2301/02* (2013.01)

(58) Field of Classification Search
CPC .. G02B 27/4244; G02B 27/126; G02B 27/14; G02B 27/30; G02B 27/0966; H01S 3/0078; H01S 2301/02
USPC ........................................ 359/569
See application file for complete search history.

(56) References Cited

U.S. PATENT DOCUMENTS 6,594,410 B2 * 7/2003 Kersey ............... H04J 14/0216
385/24

* cited by examiner

*Primary Examiner* — Wyatt A Stoffa
*Assistant Examiner* — Mitchell T Oestreich

(57) ABSTRACT

A synchronous, tunable multi-optical filter system including two or more tunable optical filters, a shared diffraction grating, and a shared rotatable optical component, for example, a reflection prism, a mirror, etc., is provided. The shared diffraction grating, disposed in optical paths of both the tunable optical filters, disperses each collimated beam received therefrom into constituent wavelengths. By rotating the shared rotatable optical component disposed at a distance from the shared diffraction grating, using a rotation mechanism, the shared rotatable optical component communicates output beams having target wavelengths selected from the constituent wavelengths, to output elements of the tunable optical filters operating in individually configurable communication modes, for example, transmission and reflection modes. The shared diffraction grating and the shared rotatable optical component facilitate synchronous tuning of the tunable optical filters across a common tuning range such that center wavelengths of the tunable optical filters substantially match each other.

20 Claims, 19 Drawing Sheets

| Optical Filter 1 | Optical Filter 2 |
|---|---|
| Transmission mode | Transmission mode |
| Transmission mode | Reflection mode |
| Reflection mode | Transmission mode |
| Reflection mode | Reflection mode |

FIG. 5

SYNCHRONOUS, TUNABLE MULTI-OPTICAL FILTER SYSTEM

BACKGROUND

Tunable optical filters are typically used in applications where a selected transmitted light spectrum or a reflected light spectrum needs to be tuned over a particular wavelength range. In some applications, for example, in multi-stage amplification of tunable lasers where out-of-band amplified spontaneous emission (ASE) noise needs to be removed after each stage, additional tunable optical filters may be used, which need to be tuned synchronously with a main filter to remove the ASE noise. In a conventional optical filter system, each tunable optical filter uses its own individual diffraction grating and its own individual reflection prism or reflection mirror, which makes it very difficult to synchronize multiple tunable optical filters at the same time. For example, if there are two tunable optical filters that need to be synchronized, it is very difficult to tune the two reflection prisms or reflection mirrors at the same angle at the same time with high precision. Moreover, external control of two or more tunable optical filters, especially narrow bandwidth optical filters, is unreliable as any slight center wavelength drift between these tunable optical filters causes a mismatch of the center wavelengths of these tunable optical filters and results in a substantial optical power loss of these tunable optical filters and distortion in the shape of the output optical spectrum of these tunable optical filters.

Furthermore, high power, wavelength-tunable, pulsed fiber lasers (WTPFLs) and wavelength-tunable, continuous fiber lasers (WTCFLs) that emit electromagnetic radiation from an ultraviolet (UV) to mid-infrared wavelength range, for example, in a 1 micrometer ($\mu$m) to 2 $\mu$m spectral region, have become increasingly prominent due to their wide range of applications, for example, in nonlinear microscopy, nonlinear fiber lasers, spectroscopy, micromachining, biology, medicine, etc. For these applications, a gain medium such as an ytterbium (Yb)-doped fiber is typically used due to its broad gain bandwidth spectrum, high optical conversion efficiency, and large saturation fluence. A wide variety of mode-locked fiber laser schemes in combination of different wavelength-selective elements have been utilized to generate WTPFL and/or WTCFL sources. One conventional WTPFL source comprises, for example, a 1020 nanometer (nm)-1060 nm WTPFL utilizing a spatially inserted, birefringent plate in a cavity in which mode locking is realized by a nonlinear polarization rotation (NPR) technique or by a semiconductor-saturable absorber mirror (SESAM). Another conventional WTPFL source comprises a wider WTPFL including a diffraction grating used as a spectral filtering in a linear cavity configuration in combination of a SESAM. Other conventional WTPFL sources comprise a WTPFL including a multimode interference (MMI) filter; a high birefringence (HiBi) fiber Sagnac loop filter with a wavelength tuning range of, for example, about 20 nm; a stretch filter with a tuning range of, for example, about 12 nm; and a bending filter with a tuning range, for example, less than 12 nm, and utilizing a polarization mode fiber section inserted as a Lyot filter based on the NPR technique which provides a tuning range of, for example, about 10 nm. However, these WTPFL sources are complex and generate laser output beams having a substantially low output power with wavelengths that are not selectively and automatically tunable.

An example of a manual wavelength-tunable, pulsed fiber laser (WTPFL) is an all-fiber, semiconductor-saturable absorber mirror (SESAM) mode-locked ytterbium laser with a linear cavity, that is spectrally tunable up to about 37 nm and emits about 15.4 pulses per second (ps) with an average power of 9.6 milliwatts (mW). The manual tunability of this WTPFL is achieved by combining a conventional tunable filter based on a thin film cavity and a manually controlled polarization controller. Another WTPFL is manually tunable, for example, from about 1015 nm to about 1085 nm, with a pulse width of about 19 ps while the average output is merely 1.5 mW with a side-lobe suppression greater than about 50 decibels (dB) in the radio frequency (RF) spectrum.

Hence, there is a long-felt but unresolved need for a synchronous, tunable multi-optical filter system comprising multiple tunable optical filters that share a diffraction grating and a rotatable optical component, for example, a reflection prism, a reflection mirror, etc., and that are tuned synchronously across a common tuning range such that a center wavelength of each of the tunable optical filters substantially matches each other at all times during tuning. Furthermore, there is a need for integrating a computer-controlled, motorized, synchronous, tunable multi-optical filter system in a fiber laser system, for example, a wavelength-tunable, pulsed fiber laser (WTPFL) system, a wavelength-tunable, continuous fiber laser (WTCFL) system, etc., with one or more stages of amplification, for selectively and automatically tuning a wavelength of a laser output beam in a wide consecutive tuning range with high output power, a reduced amplified spontaneous emission (ASE) noise level, narrow linewidth, high precision, and less complexity.

SUMMARY

This summary is provided to introduce a selection of concepts in a simplified form that are further disclosed in the detailed description. This summary is not intended to determine the scope of the claimed subject matter.

The system disclosed herein addresses the above-recited need for a synchronous, tunable multi-optical filter system comprising multiple tunable optical filters that share a diffraction grating and a rotatable optical component, for example, a reflection prism, a reflection mirror, etc., and that are tuned synchronously across a common tuning range such that a center wavelength of each of the tunable optical filters substantially matches each other at all times during tuning. The center wavelengths of the tunable optical filters being substantially matched during tuning reduce optical power loss of these tunable optical filters, and reduce distortion in the shape of the output optical spectrum of these tunable optical filters. Furthermore, the system disclosed herein addresses the above-recited need for integrating a computer-controlled, motorized, synchronous, tunable multi-optical filter system in a fiber laser system, for example, a wavelength-tunable, pulsed fiber laser (WTPFL) system, a wavelength-tunable, continuous fiber laser (WTCFL) system, etc., with one or more stages of amplification, for selectively and automatically tuning a wavelength of a laser output beam in a wide consecutive tuning range with high output power, a reduced amplified spontaneous emission (ASE) noise level, narrow linewidth, high precision, and less complexity. The synchronous, tunable multi-optical filter system is configured to be integrated in a fiber laser system, for example, a WTPFL system, a WTCFL system, etc., comprising a seed stage and one or more amplifier stages, for reducing ASE noise generated in the seed stage and the amplifier stage(s).

The synchronous, tunable multi-optical filter system disclosed herein comprises a first tunable optical filter and one or more second tunable optical filters, herein collectively referred to as "tunable optical filters". The synchronous, tunable multi-optical filter system further comprises a diffraction grating and a rotatable optical component that are common to and shared by both the first tunable optical filter and the second tunable optical filter(s), and are herein referred to as a "shared diffraction grating" and a "shared rotatable optical component" respectively. In an embodiment, each of the tunable optical filters comprises its own optical path with optical fiber collimators. In another embodiment, each of the tunable optical filters comprises its own optical path without optical fiber collimators. The second tunable optical filter(s) is disposed at a predetermined location proximal to the first tunable optical filter. The shared diffraction grating is a dispersive optical component that separates constituent wavelengths of an input optical beam. In an embodiment, the shared rotatable optical component is a rotatable optical reflection prism configured to separate an output optical beam from an input optical beam at different heights. The rotatable optical reflection prism is an optical component that reflects a wavelength selected from the constituent wavelengths at a different angle by rotation, into the output optical beam. In another embodiment, the shared rotatable optical component is a reflection mirror configured to reflect an output optical beam back to a source of the input optical beam.

The shared diffraction grating is disposed in the optical paths of both the first tunable optical filter and the second tunable optical filter(s). The shared diffraction grating is configured to receive collimated beams from input elements of the tunable optical filters. In an embodiment, the input element of each of the tunable optical filters comprises an input collimator configured to collimate an optical beam received from an input source. In another embodiment, the input element of each of the tunable optical filters comprises an input source disposed in a free space optical connection to the shared diffraction grating. In this embodiment, the input source is configured to pass each of the collimated beams to the shared diffraction grating through free space. In an embodiment, the synchronous, tunable multi-optical filter system further comprises an optical assembly disposed between the shared diffraction grating and the input elements of the tunable optical filters for reducing bandwidths of the tunable optical filters. The optical assembly is configured to adjust the size of the collimated beams incident on the shared diffraction grating such that the bandwidths of the tunable optical filters are different, while the center wavelengths and the tuning ranges of the tunable optical filters are common thereto. In an embodiment, the optical assembly is a beam expander comprising a pair of optical elements, for example, cylindrical lenses, arranged to increase one dimension size of the collimated beams.

In an embodiment, the shared diffraction grating is a transmission grating. In another embodiment, the shared diffraction grating is a reflection grating. The shared diffraction grating is configured to disperse each of the collimated beams into constituent wavelengths. The shared rotatable optical component is disposed at a predetermined distance from the shared diffraction grating. The shared rotatable optical component is configured to receive the dispersed collimated beams and communicate output beams having target wavelengths selected from among the constituent wavelengths, to output elements of the tunable optical filters operating in individually configurable communication modes, for example, a transmission mode and a reflection mode. In an embodiment, the output element of each of the tunable optical filters comprises an output collimator configured to further tune the target wavelengths of the output beams. The target wavelengths are in a tuning range, for example, from about 0.1 nanometers to about 9000 nanometers. The second tunable optical filter(s), which is typically disposed in an amplifier stage of a fiber laser system, is tuned synchronously with the first tunable optical filter across a common tuning range by using the shared diffraction grating and by rotating the shared rotatable optical component such that a center wavelength of the first tunable optical filter substantially matches with a center wavelength of the second tunable optical filter(s), for reducing amplified spontaneous emission (ASE) noise in the amplifier stage of the fiber laser system.

In an embodiment where the shared rotatable optical component is a reflection prism, the reflection prism separates the dispersed collimated beams from the output beams and transmits the output beams having the target wavelengths to the output elements of the tunable optical filters in the transmission mode. The reflection prism is configured to separate the input collimator from the output collimator at different heights and transmit the output beams having the target wavelengths to the output collimator of each of the tunable optical filters in the transmission mode, after the collimated beams pass through the shared diffraction grating, for example, a transmission grating, twice. In another embodiment where the shared rotatable optical component is a mirror, the mirror reflects the output beams having the target wavelengths back to the input elements, that is, in an embodiment, to the same input collimators of the tunable optical filters in the reflection mode, after the collimated beams pass through the shared diffraction grating, for example, the transmission grating, twice. The synchronous, tunable multi-optical filter system further comprises a rotation mechanism operably coupled to the shared rotatable optical component. The rotation mechanism is shared by the tunable optical filters. The rotation mechanism is configured to rotate the shared rotatable optical component for selecting the target wavelengths of the output beams after the collimated beams pass through the shared diffraction grating, for example, the transmission grating. By sharing the same diffraction grating and the same rotatable optical component, the second tunable optical filter(s) is tuned synchronously with the first tunable optical filter across a common tuning range such that a center wavelength of the first tunable optical filter substantially matches with a center wavelength of the second tunable optical filter(s) during a wavelength tuning operation.

Disclosed herein is also a method for synchronously tuning wavelengths of output beams in optical and/or optoelectronic systems using the synchronous, tunable multi-optical filter system disclosed above. In the method disclosed herein, the synchronous, tunable multi-optical filter system comprising multiple tunable optical filters, the shared diffraction grating, and the shared rotatable optical component disclosed above, is disposed in the optical and/or optoelectronic systems. The shared diffraction grating receives the collimated beams from the input elements of the tunable optical filters and disperses each of the received collimated beams into constituent wavelengths. By rotating the shared rotatable optical component, target wavelengths are selected from among the constituent wavelengths and output beams having the target wavelengths are communicated by the shared rotatable optical component to the output elements of the tunable optical filters.

In one or more embodiments, related systems comprise circuitry for executing the methods disclosed herein. The circuitry comprises one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components, structures, and methods disclosed herein. The description of a component, or a structure, or a method step referenced by a numeral in a drawing is applicable to the description of that component or structure or method step shown by that same numeral in any subsequent drawing herein.

FIG. 5 exemplarily illustrates a table showing combinations of communication modes in which two tunable optical filters of the synchronous, tunable multi-optical filter system are individually configured to operate.

DETAILED DESCRIPTION

Figure 7A:
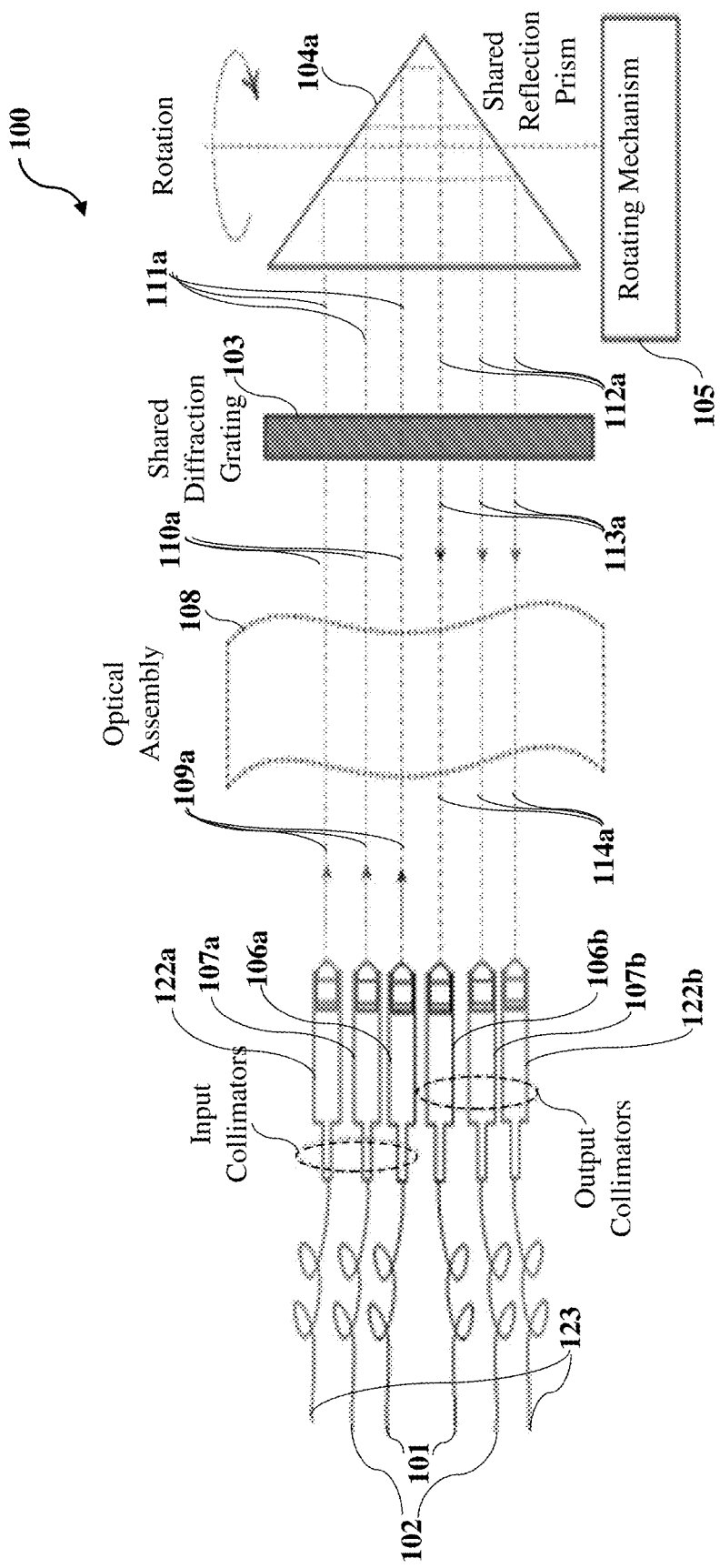
FIG. 7A exemplarily illustrates an embodiment of the synchronous, tunable multi-optical filter system comprising three tunable optical filters, a shared diffraction grating, and a shared reflection prism.
Figure 7B:
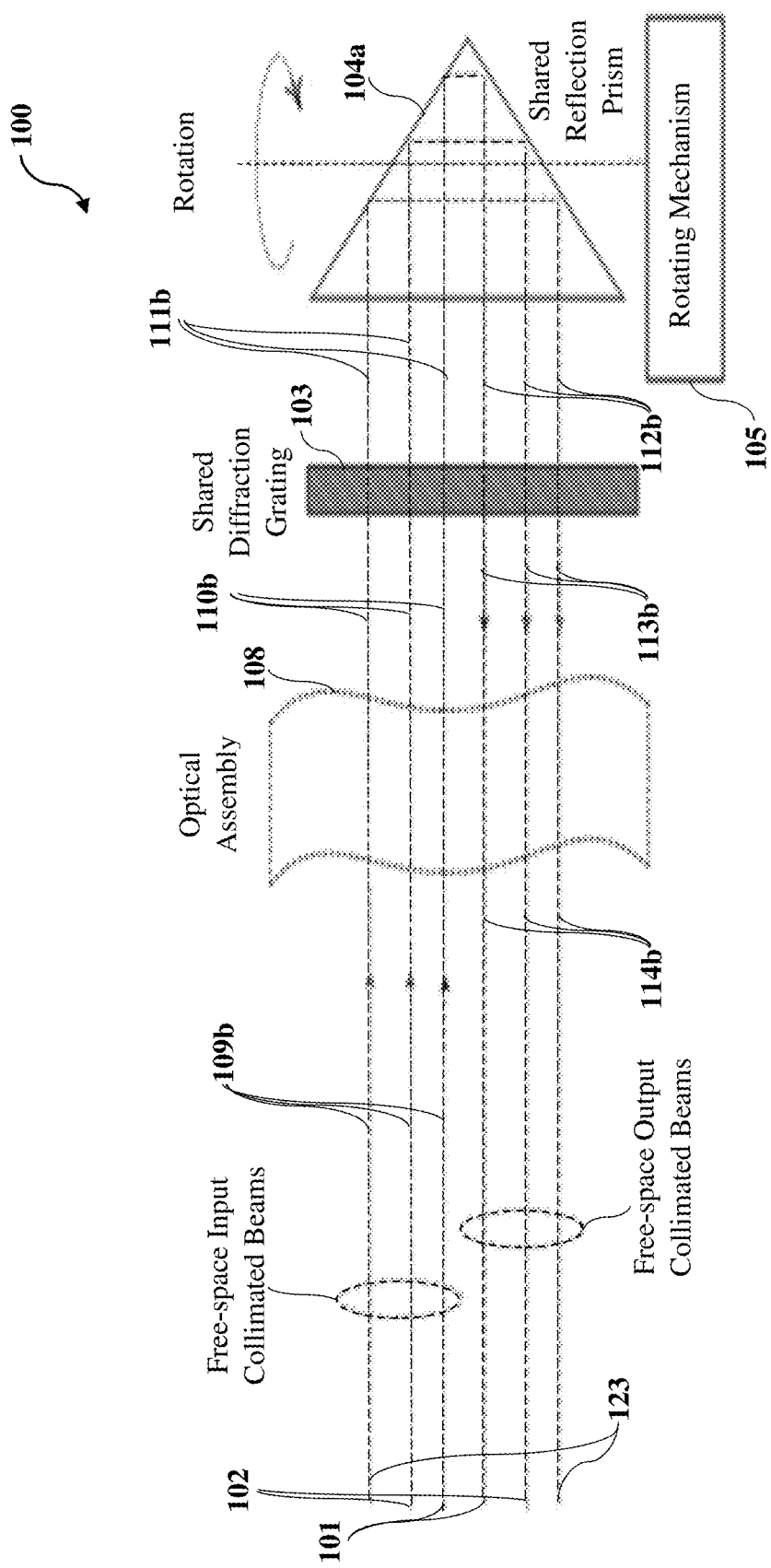
FIG. 7B exemplarily illustrates another embodiment of the synchronous, tunable multi-optical filter system comprising three tunable optical filters, a shared diffraction grating, and a shared reflection prism.

Disclosed herein is a synchronous, tunable multi-optical filter system 100 comprising multiple tunable optical filters, for example, two tunable optical filters 101 and 102 as exemplarily illustrated in FIGS. 1A-1B, FIGS. 2A-2B, FIGS. 3A-3B, and FIGS. 4A-4B, three tunable optical filters 101, 102, and 123 as exemplarily illustrated in FIGS. 7A-7B, or any number of tunable optical filters that size requirements of a system, for example, an optical system, an optoelectronic system, a fiber laser system such as a wavelength-tunable, pulsed fiber laser (WTPFL) system, a wavelength-tunable, continuous fiber laser (WTCFL) system, etc., an electronic system, etc., permit. Optical filters are optical devices that selectively transmit light of a particular wavelength from light of a range of different wavelengths. As used herein, "tunable optical filter" refers to an optical filter with tunable filter parameters comprising, for example, 3 decibel (dB) bandwidth, 10 dB bandwidth, center wavelength of a passband, filter transmission for a wide range of wavelengths, side lobe suppression rate, polarized or nonpolarized light properties, insertion loss, tuning range, tuning speed, tuning resolution, fiber type, operation temperature, dimensions etc. The center wavelength refers to a midpoint of spectral bandwidth over which the optical filter transmits light. Some coated optical filters achieve a maximum transmission near the center wavelength, whereas other hard coated optical filters have a fairly flat transmission profile over the spectral bandwidth.

Parameters of an optical filter, for example, refractive index, length of a propagation path, etc., are changed using a control mechanism to create a tunable optical filter and achieve wavelength tunability and bandwidth adjustability in the tunable optical filter. When these parameters are changed, the phase and the intensity of a propagating light wave changes as a function of wavelength, thereby achieving wavelength selectivity in the tunable optical filter. In an embodiment, the tunable optical filters, for example, 101, 102, and 123, of the synchronous, tunable multi-optical filter system 100 are selected from among shortpass filters, longpass filters, and bandpass filters. Shortpass filters allow wavelengths shorter than a threshold wavelength to pass therethrough, while excluding or blocking longer wavelengths. Longpass filters allow wavelengths longer than a threshold wavelength to pass therethrough, while excluding or blocking shorter wavelengths. Bandpass filters allow a configurable range or band of wavelengths to pass therethrough, while excluding or blocking other wavelengths around the band. The tunable optical filters 101 and 102 are individually configured to operate in communication modes, for example, a transmission mode and a reflection mode, as disclosed in the description of FIG. 5. In an embodiment, the tunable optical filters, for example, 101, 102, and 123, of the synchronous, tunable multi-optical filter system 100 are integrated in a fiber laser system comprising a seed stage and a predetermined number of amplifier stages, for example, one or more amplifier stages, for reducing amplified spontaneous emission (ASE) noise generated in the seed stage and the amplifier stage(s). The fiber laser system is, for example, a wavelength-tunable, pulsed fiber laser (WTPFL) system, a wavelength-tunable, continuous fiber laser (WTCFL) system, etc., with one or more amplifier stages that implement one or more stages of amplification. In an example, the tunable optical filters, for example, 101, 102, and 123, of the synchronous, tunable multi-optical filter system 100 are integrated in a WTPFL system comprising a seed oscillator and two amplifier stages, for reducing ASE noise generated by the seed oscillator, the first amplifier stage, and the second amplifier stage as disclosed in the description of FIG. 9.

The synchronous, tunable multi-optical filter system 100 further comprises a diffraction grating 103a or 103b and a rotatable optical component 104a or 104b as exemplarily illustrated in FIGS. 1A-1B, FIGS. 2A-2B, and FIGS. 3A-3B, that are common to and shared by all the tunable optical filters, for example, 101, 102, and 123, of the synchronous, tunable multi-optical filter system 100, and that are herein referred to as a "shared diffraction grating" and a "shared rotatable optical component" respectively. The shared diffraction grating 103a or 103b is a dispersive optical component made, for example, from fused silica, a glass material, etc., with a periodic structure configured to diffract incident light into multiple beams of constituent wavelengths traveling in different directions or at different diffraction angles. Several parameters, for example, the angle of incidence of input beams, herein collimated beams, to the shared diffraction grating 103a or 103b; the spacing between diffracting elements such as slits, ridges, or rulings configured on the shared diffraction grating 103a or 103b; wavelengths of the incident collimated beams, etc., determine the directions or diffraction angles of travel of the diffracted beams. In an embodiment, the shared diffraction grating is a transmission grating 103a as exemplarily illustrated in FIGS. 1A-1B and FIG. 2A. In another embodiment, the shared diffraction grating is a reflection grating 103b as exemplarily illustrated in FIG. 2B.

In an embodiment, the shared rotatable optical component is a rotatable optical prism, for example, a reflection prism 104a as exemplarily illustrated in FIGS. 1A-1B, FIGS. 2A-2B, FIGS. 4A-4B, and FIGS. 7A-7B, configured to separate an output optical beam from an input optical beam at different heights. The rotatable optical prism is an optical component that reflects a wavelength selected from the constituent wavelengths at a different angle by rotation, into the output optical beam. The rotatable optical prism is, for example, a right-angle reflection prism 104a used as a 180-degree reflector made of fused silica, a glass material, etc. In another embodiment, the shared rotatable optical component is a reflection mirror 104b as exemplarily illustrated in FIGS. 3A-3B, configured to reflect an output optical beam back to a source of the input optical beam. By using the same diffraction grating 103a or 103b and the same rotatable optical component 104a or 104b during a wavelength tuning operation, the multiple tunable optical filters, for example, 101, 102, and 123 in the synchronous, tunable multi-optical filter system 100, are tuned synchronously across a common tuning range and their wavelength selection substantially matches each other at all times.

The wavelength tuning operation comprises rotating the shared rotatable optical component 104a or 104b using a rotation mechanism 105 as exemplarily illustrated in FIGS. 1A-1B, FIGS. 3A-3B, FIGS. 4A-4B, and FIGS. 7A-7B. The rotation mechanism 105 comprises, for example, a rotation stage with a stepper motor. In an embodiment, the synchronous, tunable multi-optical filter system 100 implements a transmission grating 103a and/or a reflection grating 103b in a structure where two tunable optical filters 101 and 102 share the same diffraction grating 103a or 103b and the same rotation mechanism 105. Synchronous tuning of the tunable optical filters, for example, 101, 102, and 123, refers to substantially matching the center wavelength of each the tunable optical filters 101, 102, and 123 during the wavelength tuning operation. The center wavelength of each of the tunable optical filters, for example, 101, 102, and 123, that are synchronously tuned through the use of the same diffraction grating 103a or 103b and the same rotatable optical component 104a or 104b, substantially matches each other at all times during the wavelength tuning operation. That is, the center wavelengths of the tunable optical filters, for example, 101, 102, and 123, that are synchronously tuned through the use of the same diffraction grating 103a or 103b and the same rotatable optical component 104a or 104b, are substantially identical to each other at all times during the wavelength tuning operation. The shared diffraction grating 103a or 103b and the shared rotatable optical component 104a or 104b, therefore, facilitate synchronization of the tunable optical filters, for example, 101, 102, and 123, during the wavelength tuning operation.

Figure 1A:
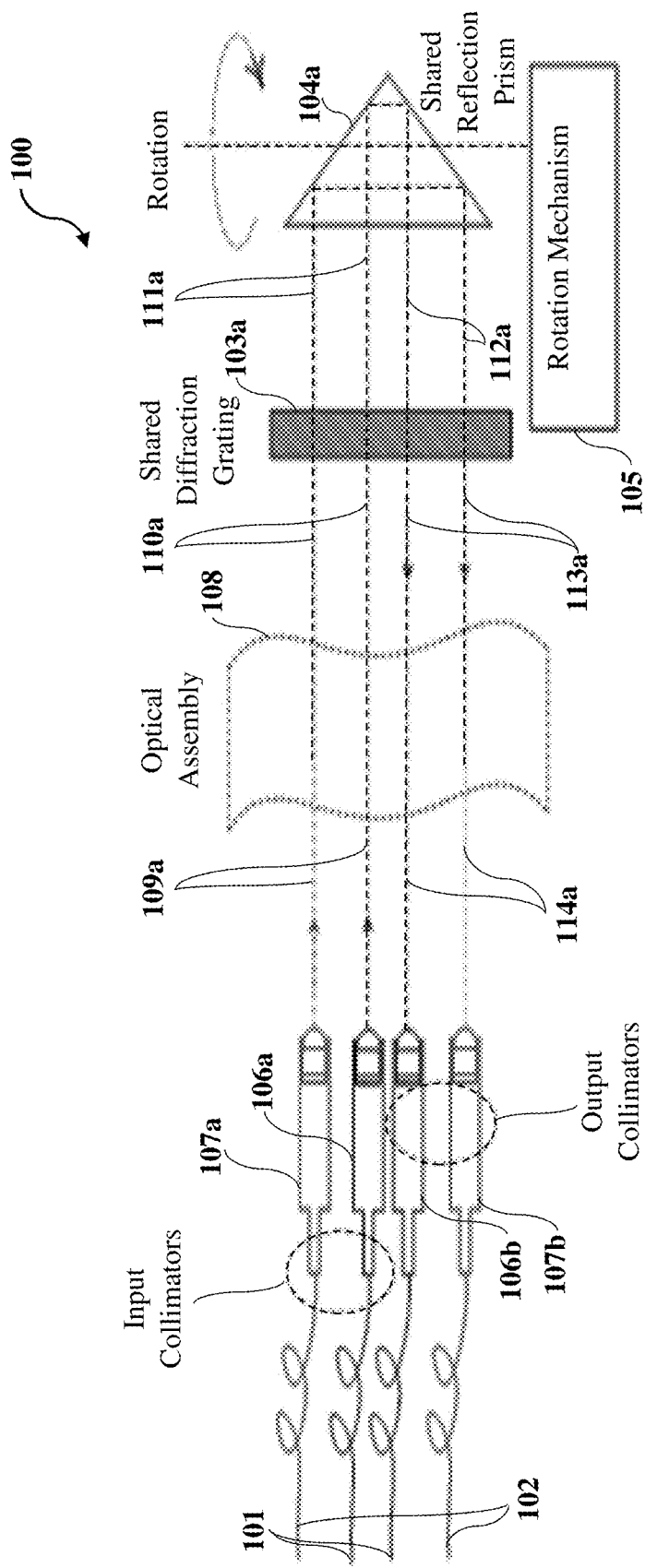
FIG. 1A exemplarily illustrates an embodiment of a synchronous, tunable multi-optical filter system comprising two tunable optical filters, a shared diffraction grating, and a shared reflection prism.

FIG. 1A exemplarily illustrates an embodiment of the synchronous, tunable multi-optical filter system 100 comprising two tunable optical filters 101 and 102, a shared diffraction grating, for example, a shared transmission grating 103a, and a shared rotatable optical component, for example, a shared reflection prism 104a. The synchronous, tunable multi-optical filter system 100 in FIG. 1A exemplarily illustrates an optical fiber implementation of the tunable optical filters 101 and 102. The first tunable optical filter 101 and the second tunable optical filter 102 of the synchronous, tunable multi-optical filter system 100 with the shared transmission grating 103a and the shared reflection prism 104a, are herein collectively referred to as "tunable optical filters". The synchronous, tunable multi-optical filter system 100 with the two tunable optical filters 101 and 102 using the same transmission grating 103a and the same reflection prism 104a is herein referred to as a "synchronous, tunable dual optical filter".

In an embodiment, each of the tunable optical filters 101 and 102 comprises its own optical path with optical fiber collimators. For example, the first tunable optical filter 101 comprises an input collimator 106a and an output collimator 106b, and the second tunable optical filter 102 comprises an input collimator 107a and an output collimator 107b, as exemplarily illustrated in FIG. 1A. In another embodiment, each of the tunable optical filters 101 and 102 comprises its own optical path without optical fiber collimators as exemplarily illustrated in FIG. 1B. In an embodiment, the two optical fiber collimators 106a and 106b of the first tunable optical filter 101 and the two optical fiber collimators 107a and 107b of the second tunable optical filter 102 are vertically aligned with respect to each other and to the shared transmission grating 103a and the shared reflection prism 104a.

The second tunable optical filter 102 is disposed at a predetermined location proximal to the first tunable optical filter 101. For example, the second tunable optical filter 102 is disposed in an amplifier stage of a fiber laser system, for example, a wavelength-tunable, pulsed fiber laser (WTPFL) system, a wavelength-tunable, continuous fiber laser (WTCFL) system, etc., with one or more amplifier stages. The shared transmission grating 103a is disposed in the optical paths of both the first tunable optical filter 101 and the second tunable optical filter 102. The shared transmission grating 103a resolves each of the collimated beams 109a, 110a into spectra. The shared transmission grating 103a is configured to receive collimated beams 109a, 110a from input elements of the tunable optical filters 101 and 102. The input elements comprise input sources of light passing through optical fibers 201a and 202a and the optical fiber collimators, that is, the input collimators 106a and 107a of the first tunable optical filter 101 and the second tunable optical filter 102 respectively, as exemplarily illustrated in FIG. 2A. The input sources are, for example, fiber laser sources.

The input collimators 106a and 107a are optical devices that focus and align input beams received from respective input sources of the tunable optical filters 101 and 102 into parallel beams 109a, herein referred to as "collimated beams". The collimated beams 109a are light beams propagating substantially in one direction. The input collimators 106a and 107a are disposed in front of the shared transmission grating 103a and the shared rotatable optical component, that is, the reflection prism 104a. In an embodiment, the reflection prism 104a reflects the filtered beams 112a, 113a, 114a back to output collimators 106b and 107b, for example, drop collimators, of the first tunable optical filter 101 and the second tunable optical filter 102 respectively, as exemplarily illustrated in FIG. 1A. The input collimators 106a and 107a transform strongly diverging input beams into collimated beams 109a. The input collimators 106a and 107a of the tunable optical filters 101 and 102 respectively, are each configured to collimate an optical beam, for example, a laser beam, received from their respective input sources.

In an embodiment, the synchronous, tunable multi-optical filter system 100 further comprises an optical assembly 108 disposed between the shared transmission grating 103a and the input collimators 106a and 107a and the output collimators 106b and 107b of the tunable optical filters 101 and 102 respectively, for reducing bandwidths of the tunable optical filters 101 and 102. The optical assembly 108 comprises, for example, a pair of cylindrical lenses 108a and 108b exemplarily illustrated in FIG. 2A. The optical assembly 108 is configured to adjust the size of the collimated beams 110a incident on the shared transmission grating 103a such that the bandwidths of the tunable optical filters 101 and 102 are different, while the center wavelength and the tuning range of the first tunable optical filter 101 are common to the center wavelength and the tuning range of the second tunable optical filter 102 respectively. In an embodiment, the optical assembly 108 is configured to expand beam sizes of the optical fiber collimators 106a, 107a, 106b, and 107b. In another embodiment, the optical assembly 108 is configured to shrink beam sizes of the optical fiber collimators 106a, 107a, 106b, and 107b. In an embodiment, the optical assembly 108 is a beam expander configured to increase the size, for example, the diameters of the collimated beams 109a to larger collimated beams 110a as disclosed in the description of FIG. 2A. In this embodiment, the optical assembly 108 increases the beam area quadratically with respect to its magnification without substantially affecting the total energy contained within the collimated beams 110a.

The input collimators 106a and 107a pass the collimated beams 109a to the shared transmission grating 103a. In an embodiment as exemplarily illustrated in FIG. 1A, after adjusting the size of the collimated beams 109a, the optical assembly 108 passes the adjusted collimated beams 110a to the shared transmission grating 103a. The synchronous, tunable multi-optical filter system 100 implements the transmission grating 103a in a structure where two tunable optical filters 101 and 102 share the same transmission grating 103a and the same rotation mechanism 105. The shared transmission grating 103a is configured to transmit and disperse each of the collimated beams 110a into constituent wavelengths. Slits or rulings configured on the shared transmission grating 103a create a superposition of waves that diffract each of the collimated beams 110a by wavelength, thereby separating each of the collimated beams 110a into its constituent wavelengths or colors. The periodic structure of the shared transmission grating 103a affects amplitude and phase of the incident collimated beams 110a, causing interference in the dispersed beams 111a. The shared transmission grating 103a disperses each of the collimated beams 110a spatially through a range of angles onto the shared reflection prism 104a. After the incident collimated beams 110a interact with the shared transmission grating 103a, the resulting dispersed beams 111a from the shared transmission grating 103a are each composed of the sum of interfering wave components emanating from each slit or ruling in the shared transmission grating 103a. In an embodiment, the dispersed beams 111a travel in a parallel orientation toward the shared reflection prism 104a as exemplarily illustrated in FIG. 1A.

The shared reflection prism 104a is disposed at a predetermined distance from the shared transmission grating 103a, in the optical path of the dispersed beams 111a. The shared reflection prism 104a is configured to receive the dispersed beams 111a and communicate output beams 112a, 113a, 114a having target wavelengths selected from among the constituent wavelengths, to output elements of the tunable optical filters 101 and 102. The target wavelengths are in a tuning range, for example, from about 0.1 nanometers to about 9000 nanometers. The tuning range differs based on the application. For example, in optical telecommunication, the tuning range of the tunable optical filters 101 and 102 is from about 1510 nm to about 1620 nm; for a biomedical application, the tunable optical filters 101 and 102 are used for transmitting visible wavelength of about 400 nm to about 600 nm with a tuning range of about 1 nm to about 200 nm; for an infrared wavelength application, the tuning range is from about 1 nm to about 5000 nm. In another example, the tunable optical filters 101 and 102 are used for transmitting ultraviolet (UV) wavelength ranging from about 100 nm to about 400 nm with a tuning range from about nm to about 400 nm. In another example, the tunable optical filters 101 and 102 are used for transmitting mid-infrared wavelength ranging from about 1.7 micrometers (μm) to about 10 μm with a tuning range from about 0.5 nm to about 9000 nm.

In the embodiment exemplarily illustrated in FIG. 1A, the shared reflection prism 104a is configured to separate the dispersed beams 111a from the output beams 112a, 113a, 114a, and transmit the output beams 112a, 113a, 114a having the target wavelengths to the output elements of the tunable optical filters 101 and 102 in the transmission mode. That is, the shared reflection prism 104a separates the input collimators 106a and 107a from the output collimators 106b and 107b respectively, and transmits the output beams 112a, 113a, 114a having the target wavelengths to the output collimators 106b and 107b of the tunable optical filters 101 and 102 respectively, in the transmission mode.

The rotation mechanism 105 of the synchronous, tunable multi-optical filter system 100 is operably coupled to the shared reflection prism 104a and shared by the two tunable optical filters 101 and 102, which facilitates synchronous tuning of the tunable optical filters 101 and 102. The rotation mechanism 105 is configured to rotate the shared reflection prism 104a for selecting the target wavelengths of the output beams 112a. The rotation mechanism 105 comprises, for example, one or more of stepper motors, servo motors, piezoelectric components, linear actuators, etc., for rotating the shared reflection prism 104a. When the rotation mechanism 105 rotates the shared reflection prism 104a, the first tunable optical filter 101 and the second tunable optical filter 102 are synchronized. The rotation mechanism 105 performs tuning over the tuning range by changing the angle of the shared reflection prism 104a with respect to the angle of incidence of the dispersed beams 111a. The second tunable optical filter 102 is configured to be tuned synchronously with the first tunable optical filter 101 across a common tuning range by using the shared transmission grating 103a and by rotating the shared reflection prism 104a such that a center wavelength of the first tunable optical filter 101 substantially matches with a center wavelength of the second tunable optical filter 102. Because the first tunable optical filter 101 and the second tunable optical filter 102 are using the same transmission grating 103a and the same reflection prism 104a, the tuning wavelengths of the first tunable optical filter 101 and the second tunable optical filter 102 substantially match each other. The second tunable optical filter 102, which is typically disposed in an amplifier stage of a fiber laser system, is tuned synchronously with the first tunable optical filter 101 for reducing amplified spontaneous emission (ASE) noise in the amplifier stage of the fiber laser system.

In an embodiment, on receiving the dispersed beams 111a from the shared transmission grating 103a, the shared reflection prism 104a reflects the output beams 112a having an offset in a vertical direction with the target wavelengths to the output elements, for example, the output collimators 106b and 107b of the tunable optical filters 101 and 102 respectively, via the shared transmission grating 103a. The shared reflection prism 104a separates the dispersed beams 111a from the output beams 112a. After dispersion of the collimated beams 110a by the shared transmission grating 103a, the shared reflection prism 104a selects the desired wavelength, that is, the target wavelength, by rotation for the wavelength tuning operation. The shared reflection prism 104a changes the position of the dispersed beams 111a, and hence the output beams 112a have an offset in the vertical direction. The output beams 112a pass through the shared transmission grating 103a. In an embodiment, the output beams 113a exiting the shared transmission grating 103a pass to the output collimators 106b and 107b of the tunable optical filters 101 and 102 respectively. In an embodiment, the output collimators 106b and 107b of the tunable optical filters 101 and 102 respectively, are configured to further tune the target wavelengths of the output beams 113a. The output collimators 106b and 107b are, for example, drop collimators, configured to receive the target wavelengths of the output beams 113a.

As exemplarily illustrated in FIG. 1A, the input collimated beams 109a received from the input collimators 106a and 107a of the tunable optical filters 101 and 102 respectively, pass through the optical assembly 108 and exit the optical assembly 108 as adjusted collimated beams 110a. The adjusted collimated beams 110a pass through the shared transmission grating 103a and exit the shared transmission grating 103a as dispersed beams 111a. The shared reflection prism 104a reflects the dispersed beams 111a and passes the output beams 112a through the shared transmission grating 103a. The output beams 113a exiting the shared transmission grating 103a are passed to the optical assembly 108. The output beams 114a exiting the optical assembly 108 are then passed to the output collimators 106b and 107b of the tunable optical filters 101 and 102 respectively. By using the shared transmission grating 103a and by rotating the shared reflection prism 104a using the rotation mechanism 105, the tunable optical filters 101 and 102 are synchronized or synchronously tuned across a common tuning range such that the center wavelengths of the tunable optical filters 101 and 102 substantially match each other.

Figure 1B:
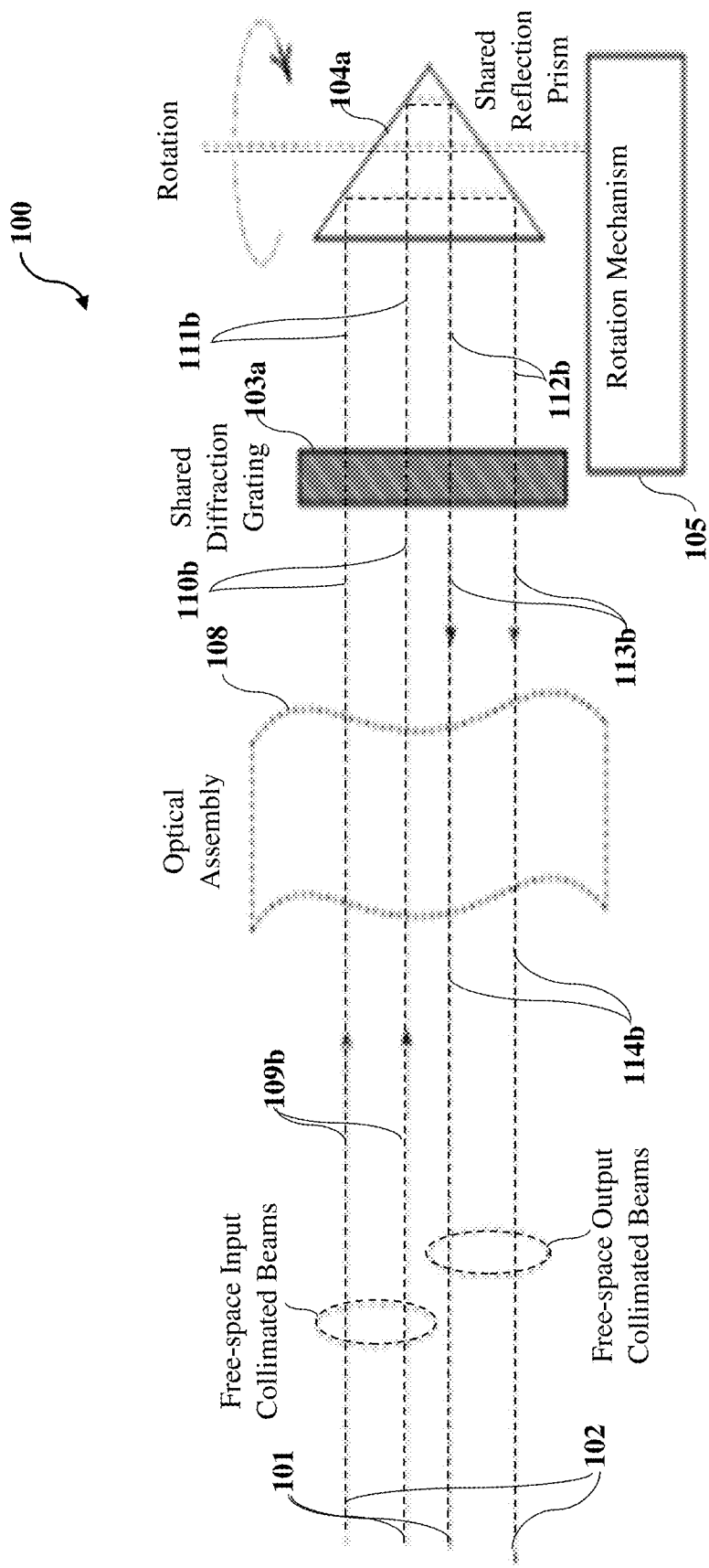
FIG. 1B exemplarily illustrates another embodiment of the synchronous, tunable multi-optical filter system comprising two tunable optical filters, a shared diffraction grating, and a shared reflection prism.

FIG. 1B exemplarily illustrates another embodiment of the synchronous, tunable multi-optical filter system 100 comprising two tunable optical filters 101 and 102, a shared diffraction grating, for example, a shared transmission grating 103a, and a shared reflection prism 104a. In this embodiment, the input elements of the first tunable optical filter 101 and the second tunable optical filter 102 comprise input sources disposed in a free space optical connection to the shared transmission grating 103a, free of the input collimators 106a and 107a exemplarily illustrated in FIG. 1A. In this embodiment, the input sources are configured to pass free-space input collimated beams 109b to the shared transmission grating 103a through free space. The synchronous, tunable multi-optical filter system 100 with the two tunable optical filters 101 and 102 using the same transmission grating 103a and the same reflection prism 104a, as illustrated in this embodiment, is herein referred to as a "synchronous, tunable dual optical free-space filter". The free-space input collimated beams 109b are light beams propagating substantially in one direction through free space. The transmission grating 103a and the reflection prism 104a are common to and shared by both the tunable optical filters 101 and 102, thereby facilitating synchronous tuning of the tunable optical filters 101 and 102.

The shared transmission grating 103a is disposed in an optical path of the free-space collimated beams 109b. In an embodiment, the shared transmission grating 103a receives the free-space collimated beams 109b from the input sources of the tunable optical filters 101 and 102. In an embodiment, an optical assembly 108 is disposed between the shared transmission grating 103a and the input sources of the tunable optical filters 101 and 102. The optical assembly 108 comprising, for example, a pair of cylindrical lenses 108a and 108b exemplarily illustrated in FIG. 2B, adjusts the collimated beams 109b incident on the shared transmission grating 103a such that bandwidths of the tunable optical filters 101 and 102 are different, while the center wavelength and the tuning range of the first tunable optical filter 101 are common to the center wavelength and the tuning range of the second tunable optical filter 102 respectively. In this embodiment, the shared transmission grating 103a receives the adjusted free-space collimated beams 110b from the optical assembly 108. The shared transmission grating 103a disperses each of the free-space collimated beams 110b into constituent wavelengths as disclosed in the description of FIG. 1A. In an embodiment, the dispersed beams 111b travel in a parallel orientation toward the shared reflection prism 104a as exemplarily illustrated in FIG. 1B. The shared reflection prism 104a is disposed in the optical path of the dispersed beams 111b. The shared reflection prism 104a communicates output beams 112b having target wavelengths selected from among the constituent wavelengths, through free space in the tunable optical filters 101 and 102.

The rotation mechanism 105, operably coupled to and shared by the two tunable optical filters 101 and 102, facilitates synchronous tuning of the tunable optical filters 101 and 102. The rotation mechanism 105 rotates the shared reflection prism 104a for selecting the target wavelengths of the output beams 112b as disclosed in the description of FIG. 1A. By rotating the shared reflection prism 104a, the rotation mechanism 105 tunes the second tunable optical filter 102 synchronously with the first tunable optical filter 101 across a common tuning range such that a center wavelength of the first tunable optical filter 101 substantially matches with a center wavelength of the second tunable optical filter 102. In an embodiment, the shared reflection prism 104a transmits the output beams 112b having the target wavelengths through free space in the tunable optical filters 101 and 102 via the shared transmission grating 103a. The output beams 113b exiting the shared transmission grating 103a pass through free space as exemplarily illustrated in FIG. 1B, and are referred to as free space output collimated beams. In an embodiment, the shared transmission grating 103a passes the output beams 113b having the target wavelengths to the optical assembly 108. The output beams 114b exiting the optical assembly 108 thereafter pass through free space in the tunable optical filters 101 and 102.

As exemplarily illustrated in FIG. 1B, the free space input collimated beams 109b of the tunable optical filters 101 and 102 pass through the optical assembly 108 and exit the optical assembly 108 as adjusted collimated beams 110b. The adjusted collimated beams 110b pass through the shared transmission grating 103a and exit the shared transmission grating 103a as dispersed beams 111b. The shared reflection prism 104a reflects the dispersed beams 111b and passes the output beams 112b through the shared transmission grating 103a. The output beams 113b exiting the shared transmission grating 103a then pass through the optical assembly 108 for further adjustment. The output beams 114b exiting the optical assembly 108 constitute the free space output collimated beams of the tunable optical filters 101 and 102. By using the shared transmission grating 103a and by rotating the shared reflection prism 104a using the rotation mechanism 105, the tunable optical filters 101 and 102 are synchronized or synchronously tuned across a common tuning range such that the center wavelengths of the tunable optical filters 101 and 102 substantially match each other.

Figure 2A:
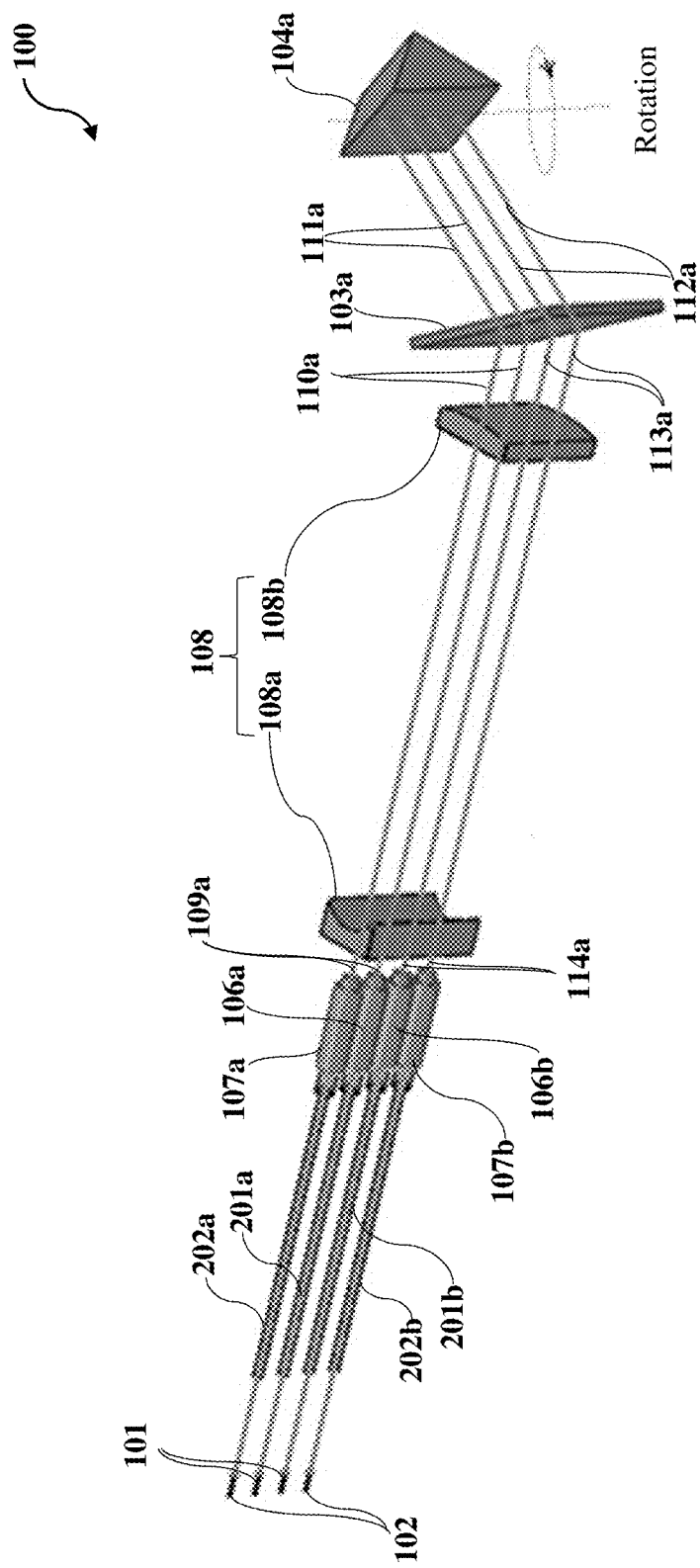
FIG. 2A exemplarily illustrates a perspective view of an embodiment of the synchronous, tunable multi-optical filter system comprising two tunable optical filters, a shared transmission grating, and a shared reflection prism.

FIG. 2A exemplarily illustrates a perspective view of an embodiment of the synchronous, tunable multi-optical filter system 100 comprising two tunable optical filters 101 and 102, a shared transmission grating 103a, and a shared reflection prism 104a. As exemplarily illustrated in FIG. 2A, in addition to the two tunable optical filters 101 and 102, the shared transmission grating 103a, and the shared reflection prism 104a, the synchronous, tunable multi-optical filter system 100 comprises input collimators 106a and 107a, output collimators 106b and 107b, and an optical assembly 108. In an embodiment as exemplarily illustrated in FIG. 2A, the first tunable optical filter 101 comprises the input collimator 106a and the output collimator 106b operably coupled to optical fibers 201a and 201b respectively. Similarly, the second tunable optical filter 102 comprises the input collimator 107a and the output collimator 107b operably coupled to optical fibers 202a and 202b respectively. Example specifications of the components of the synchronous, tunable multi-optical filter system 100 are as follows: the beam size of each of the collimators 106a, 107a, 106b, and 107b is about 400 micrometers; the wavelength tuning range is about 1460 nm to about 1630 nm; and the 3 dB bandwidth of each of the tunable optical filters 101 and 102 is about 0.2 nm without the optical assembly 108. If a 10× cylindrical lens pair is used as the optical assembly 108, the output beam size on the shared transmission grating 103a is about 0.4 mm×4 mm, and the 3 dB bandwidth of the tunable optical filter 101 or 102 is about 0.02 nm. The wavelength tuning resolution is, for example, about 0.003 nm per step of the rotation mechanism 105, for example, the stepper motor; the wavelength tuning speed is about 2 nm per second; the side lobe suppression is about dB; the operation temperature is from about 10 degrees Celsius to about 40 degrees Celsius; and the dimensions of each tunable filter 101 and 102 are about 110 mm×210 mm×50 mm.

Optical beams, for example, optical fiber laser beams, pass through the optical fibers 201a and 202a and enter the input collimators 106a and 107a of the tunable optical filters 101 and 102 respectively. The input collimators 106a and 107a collimate the optical beams received through the optical fibers 201a and 202a respectively. In an embodiment, each of the input collimators 106a and 107a comprises a tube containing an optical element (not shown), for example, a convex lens or a mirror, at a first end and an adjustable aperture (not shown) at a second end opposing the first end, the aperture being in the focal plane of the optical element. The optical beam entering the aperture leaves each input collimator 106a and 107a as a parallel beam, herein referred to as a collimated beam 109a. The incident optical beam falls on the optical element of each input collimator 106a and 107a and emerges as parallel rays on the other side of the optical element. The change in orientation of the optical beam depends on the curvature of the optical element and the type of collimator used.

The collimated beams 109a from the input collimators 106a and 107a are passed through the optical assembly 108. In this embodiment, the optical assembly 108 is disposed between the shared transmission grating 103a and the collimators 106a, 107a, 106b, and 107b. As exemplarily illustrated in FIG. 2A, the optical assembly 108 is configured as a beam expander comprising a pair of optical elements, for example, a pair of cylindrical lenses 108a and 108b, arranged to increase one dimension size of the collimated beams 109a, while maintaining the collimated nature of the beam output 110a from the optical assembly 108. In various embodiments, other optical assemblies are used based on specifications of the tunable optical filters 101 and 102. In an embodiment, the beam expander also decreases the divergence of the collimated beams 109a by a factor of the magnification of the collimated beams 109a. The beam expander is, for example, transmissive beam expander such as a Galilean beam expander, in which an objective lens 108a such as a concave lens with a negative focal length and an image lens 108b such as a convex lens with a positive focal length are separated by the sum of their focal lengths. In another example, the beam expander is a transmissive beam expander such as a Keplerian beam expander, in which two lenses 108a and 108b with positive focal lengths are separated by the sum of their focal lengths to focus the collimated beams 109a to a point and then expand the collimated beams 109a as the collimated beams 109a start to diverge beyond the focal point. The Keplerian beam expander allows for spatial filtering as the collimated beams 109a focuses to a spot between the lenses 108a and 108b, producing a point within the synchronous, tunable multi-optical filter system 100 where optical energy, for example, laser energy, is concentrated. In another embodiment, reflective beam expanders comprising a pair of mirrors, for example, a convex mirror and a concave mirror, are used for expanding the collimated beams 109a.

In an embodiment, the beam expansion of the optical assembly 108 comprising the pair of cylindrical lenses 108a and 108b, is one dimensional depending on the application. In another embodiment, the beam expansion of the optical assembly 108 comprising a pair of spherical lenses or aspherical lenses, is two dimensional depending on the application. One dimension beam size of each of the input collimated beams 109a and the expanded beams 110a exiting the optical assembly 108 is expanded horizontally and another dimension beam size remains unchanged vertically by using the pair of cylindrical lenses 108a and 108b to reduce the bandwidth of the tunable optical filters 101 and 102. The optical assembly 108 comprising the pair of cylindrical lenses 108a and 108b further reduces each of the return beams 113a, that is, the output beams reflected by the shared reflection prism 104a and passing through the shared transmission grating 103a, by one dimension again. Each of the output beams 114a reduced by one dimension returns to the output collimators 106b and 107b of their respective tunable optical filters 101 and 102 without optical loss. That is, each of the output beams 114a exiting the optical assembly 108 shrinks to a one dimension beam size horizontally, with another dimension beam size remaining unchanged vertically.

In another embodiment, the optical assembly 108 comprising the pair of cylindrical lenses 108a and 108b reduces the incoming collimated beams 109a into smaller beams 110a to increase the beamwidth of the tunable optical filters 101 and 102. In an embodiment, the beam reduction of the optical assembly 108 is one dimensional depending on the application. In another embodiment, the beam reduction of the optical assembly 108 is two dimensional depending on the application. In an embodiment, the optical assembly 108 comprising the pair of cylindrical lenses 108a and 108b reduces the size of each of the input beams 109a, thereby expanding the adjusted beams 110a exiting from the optical assembly 108. The output beams 112a that are reflected by the shared reflection prism 104a pass through the shared transmission grating 103a, and the output beams 113a exiting from the shared transmission grating 103a pass through the optical assembly 108 again. The optical assembly 108 further expands the output beams 113a to generate output beams 114a of an expanded size. In another embodiment, the optical assembly 108 shrinks the collimated beams 109a in one or two dimensions to produce reduced size collimated beams 110a. The output beams 113a reflected by the shared reflection prism 104a and the shared transmission grating 103a are passed through the optical assembly 108. The optical assembly 108 expands the output beams 113a in one dimension or two dimensions to generate output beams 114a. In an embodiment, if the optical assembly 108 is used to expand the input beam size on the shared transmission grating 103a, the bandwidth of the tunable optical filter 101 or 102 can be decreased. In another embodiment, if the optical assembly 108 is used to reduce the input beam size on the shared transmission grating 103a, the bandwidth of the tunable optical filter 101 or 102 can be increased.

As exemplarily illustrated in FIG. 2A, the collimated beam output 110a from the optical assembly 108 is focused on and passes through the shared transmission grating 103a. The shared transmission grating 103a is a transparent, diffraction grating comprising parallel, transmissive or hollow grooves or slits (not shown) configured thereon. The shared transmission grating 103a comprises, for example, about 914 lines per millimeter. The shared transmission grating 103a is made, for example, from fused silica or a glass material. The shared transmission grating 103a is created, for example, by scratching or etching a transparent substrate, for example, made of glass, with a repetitive series of grooves of a narrow width separated by a distance, which creates areas where each collimated beam 110a scatters. Each slit in the shared transmission grating 103a acts as a quasi-point wave source from which light propagates in all directions. The shared transmission grating 103a disperses the collimated beam output 110a and transmits the dispersed beams 111a therethrough to the shared reflection prism 104a. The shared reflection prism 104a separates the input collimators 106a and 107a from respective output collimators 106b and 107b of the tunable optical filters 101 and 102 respectively. Rotating the shared reflection prism 104a by the rotation mechanism 105 exemplarily illustrated in FIG. 1A, reflects the output beams 112a, 113a, 114a having target wavelengths to the output collimators 106b and 107b of the tunable optical filters 101 and 102 respectively, in the transmission mode. The output beams 112a with the target wavelengths pass through the shared transmission grating 103a. The output beams 113a exiting the shared transmission grating 103a then pass through the optical assembly 108 and undergo a beam size adjustment as disclosed above. The output beams 114a exiting the optical assembly 108 are launched into the optical fibers 201b and 202b of the tunable optical filters 101 and 102 respectively, via their respective output collimators 106b and 107b.

Figure 2B:
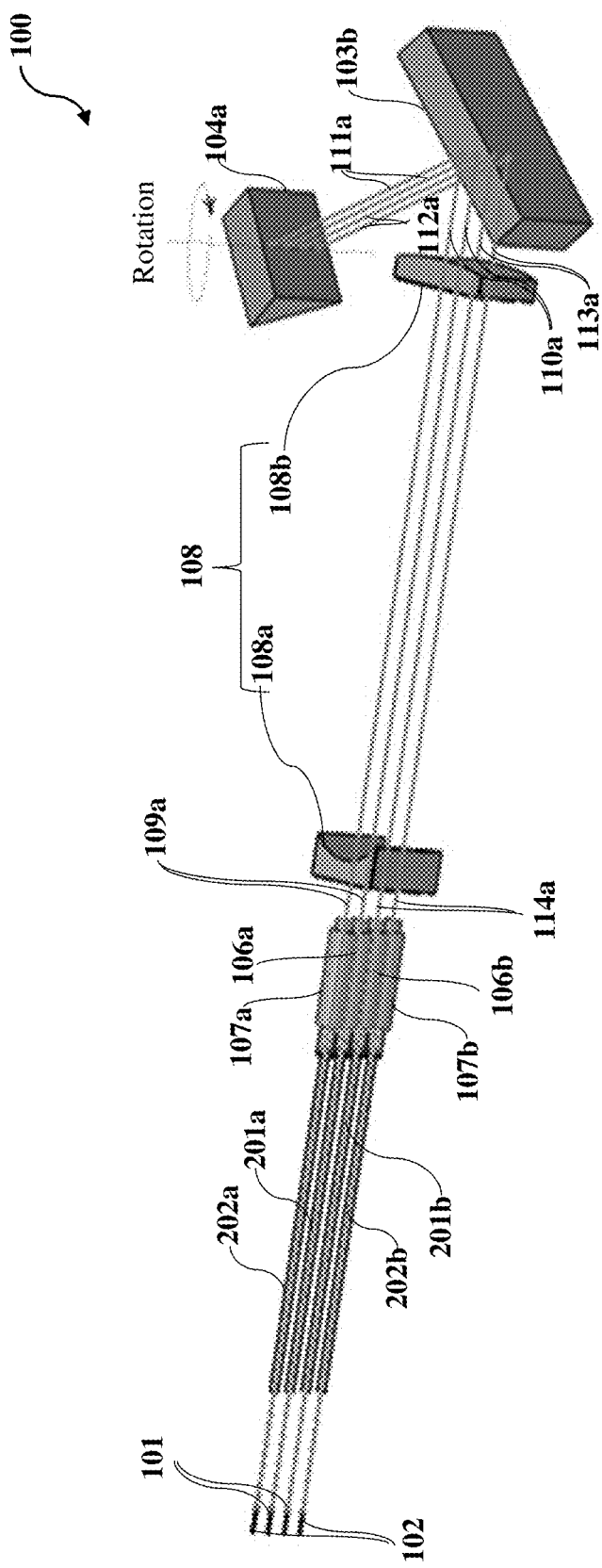
FIG. 2B exemplarily illustrates a perspective view of an embodiment of the synchronous, tunable multi-optical filter system comprising two tunable optical filters, a shared reflection grating, and a shared reflection prism.

FIG. 2B exemplarily illustrates a perspective view of an embodiment of the synchronous, tunable multi-optical filter system 100 comprising two tunable optical filters 101 and 102, a shared diffraction grating, for example, a shared reflection grating 103b, and a shared reflection prism 104a. As exemplarily illustrated in FIG. 2B, in addition to the two tunable optical filters 101 and 102, the shared reflection grating 103b, and the shared reflection prism 104a, the synchronous, tunable multi-optical filter system 100 comprises the input collimators 106a and 107a, the output collimators 106b and 107b, and the optical assembly 108 as disclosed in the description of FIG. 2A. Optical beams, for example, optical fiber laser beams, pass through the optical fibers 201a and 202a and enter the input collimators 106a and 107a of the tunable optical filters 101 and 102 respectively. The input collimators 106a and 107a collimate the optical beams received through the optical fibers 201a and 202a respectively. In an embodiment as exemplarily illustrated in FIG. 2B, the optical assembly 108 is configured as a beam expander comprising a pair of optical elements, for example, a pair of cylindrical lenses 108a and 108b, arranged to increase size of the collimated beams 109a focused thereon, while maintaining the collimated nature of the beam output 110a from the optical assembly 108.

The collimated beam output 110a from the optical assembly 108 is focused on the shared reflection grating 103b. The shared reflection grating 103b is a mirrored, diffraction grating comprising ridges or rulings (not shown) configured thereon. The shared reflection grating 103b is made, for example, from fused silica or a glass material coated with a metal coating. The shared reflection grating 103b comprises, for example, a thin metal film deposited on glass. The shared reflection grating 103b diffracts each of the collimated beams 110a back into the plane of incidence containing the shared reflection prism 104a. The shared reflection grating 103b is created, for example, by depositing a metallic coating on a substrate made of glass, plastic, etc., and creating parallel rulings in the metallic coating, which creates areas where each collimated beam 110a scatters. Each collimated beam 110a is reflected off of the ruled surface of the shared reflection grating 103b at different angles corresponding to different orders and wavelengths onto the shared reflection prism 104a. The shared reflection grating 103b, therefore, disperses the collimated beam output 110a and reflects the dispersed beams 111a to the shared reflection prism 104a. The synchronous, tunable multi-optical filter system 100 implements the reflection grating 103b in a structure where two tunable optical filters 101 and 102 share the same reflection grating 103b and the same rotation mechanism 105. In an embodiment as exemplarily illustrated in FIG. 2B, the shared reflection prism 104a separates the input collimators 106a and 107a from respective output collimators 106b and 107b of the tunable optical filters 101 and 102 respectively. Rotating the shared reflection prism 104a by the rotation mechanism 105 exemplarily illustrated in FIG. 1A, causes reflection of output beams 112a having an offset in a vertical direction and having target wavelengths to the output collimators 106b and 107b of the tunable optical filters 101 and 102 respectively, in the transmission mode. The output beams 112a with the target wavelengths pass through the shared reflection grating 103b. The output beams 113a exiting the shared reflection grating 103b then pass through the optical assembly 108 and undergo a beam size adjustment as disclosed in the description of FIG. 2A. The output beams 114a exiting the optical assembly 108 are launched into the optical fibers 201b and 202b of the tunable optical filters 101 and 102 respectively, via their respective output collimators 106b and 107b.

Figure 3A:
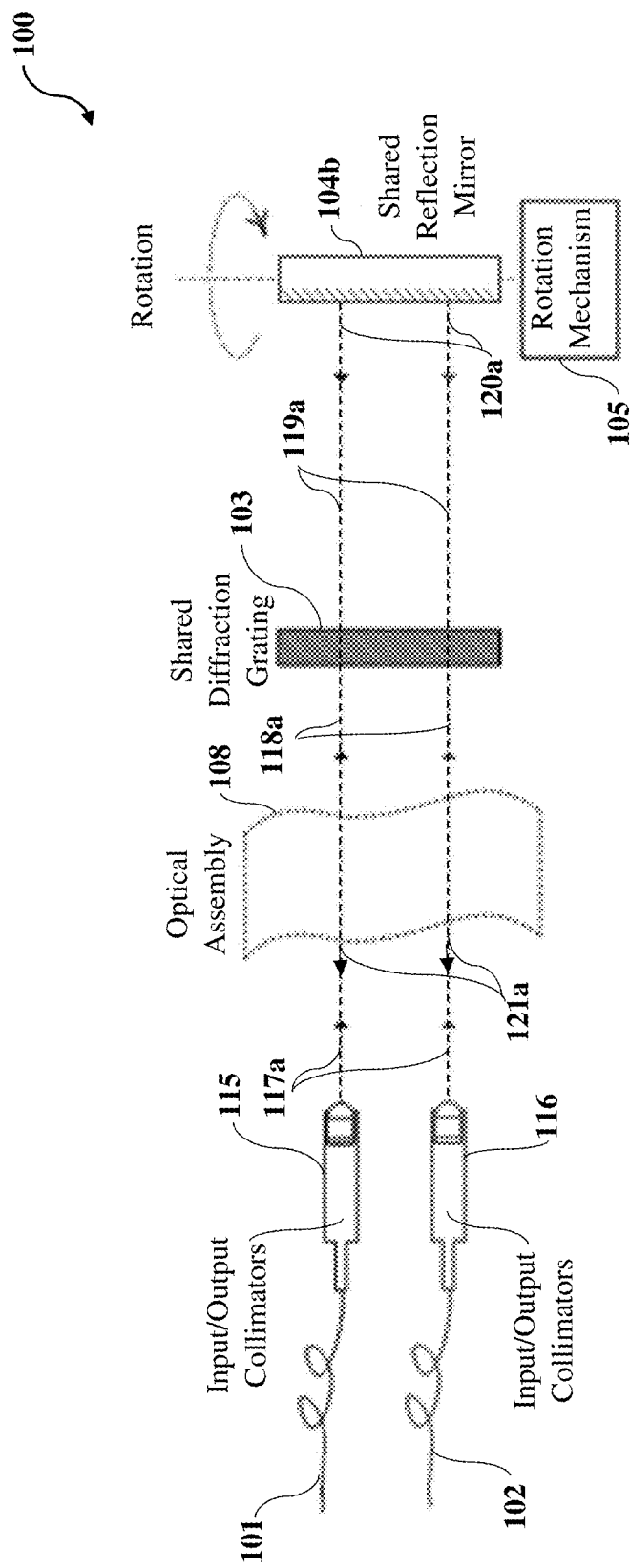
FIG. 3A exemplarily illustrates an embodiment of the synchronous, tunable multi-optical filter system comprising two tunable optical filters, a shared diffraction grating, and a shared reflection mirror.

FIG. 3A exemplarily illustrates an embodiment of the synchronous, tunable multi-optical filter system 100 comprising two tunable optical filters 101 and 102, a shared diffraction grating 103, and a shared rotatable optical component, for example, a shared reflection mirror 104b. This embodiment represents the reflection mode of the tunable optical filters 101 and 102. The shared diffraction grating 103 and the shared reflection mirror 104b are common to and shared by both the tunable optical filters 101 and 102, which facilitate synchronous tuning of the tunable optical filters 101 and 102. As exemplarily illustrated in FIG. 3A, in addition to the two tunable optical filters 101 and 102, the shared diffraction grating 103, and the shared reflection mirror 104b, the synchronous, tunable multi-optical filter system 100 comprises optical fiber collimators 115 and 116 and an optical assembly 108. In this embodiment, each of the optical fiber collimators 115 and 116 of the tunable optical filters 101 and 102 respectively, comprises an input collimator and an output collimator as exemplarily illustrated in FIG. 3A. The optical fiber collimators 115 and 116 receive and collimate input optical beams, for example, optical fiber laser beams. The collimated beams 117a from the optical fiber collimators 115 and 116 are passed through the optical assembly 108. In this embodiment, the optical assembly 108 is disposed between the shared diffraction grating 103 and the optical fiber collimators 115 and 116. The optical assembly 108 adjusts the size of the collimated beams 117a as disclosed in the description of FIG. 2A.

The collimated beam output 118a from the optical assembly 108 is focused on and passes through the shared diffraction grating 103. The shared diffraction grating 103 disperses the collimated beam output 118a and transmits the dispersed beams 119a therethrough to the shared reflection mirror 104b. After dispersion of the collimated beams 118a by the shared diffraction grating 103, the shared reflection mirror 104b selects the desired wavelength, that is, the target wavelength, by rotation for the wavelength tuning operation. In this embodiment, the shared reflection mirror 104b is configured to reflect output beams 120a having the target wavelengths back to the same optical fiber collimators 115 and 116 of the tunable optical filters 101 and 102 respectively, in a reflection mode. Rotating the shared reflection mirror 104b by the rotation mechanism 105 exemplarily illustrated in FIG. 1A, reflects the output beams 120a having an offset in the vertical direction and having target wavelengths back to the same optical fiber collimators 115 and 116 of the tunable optical filters 101 and 102 respectively, in the reflection mode. The shared reflection mirror 104b does not change the position of the dispersed beams 119a and hence the output beams 120a have the same position as the dispersed beams 119a in the vertical direction. The output beams 120a with the target wavelengths pass through the shared diffraction grating 103 and then through the optical assembly 108 and undergo a beam size adjustment as disclosed in the description of FIG. 2A. The output beams 121a exiting the optical assembly 108 are launched into the optical fiber collimators 115 and 116 of the tunable optical filters 101 and 102 respectively.

Figure 3B:
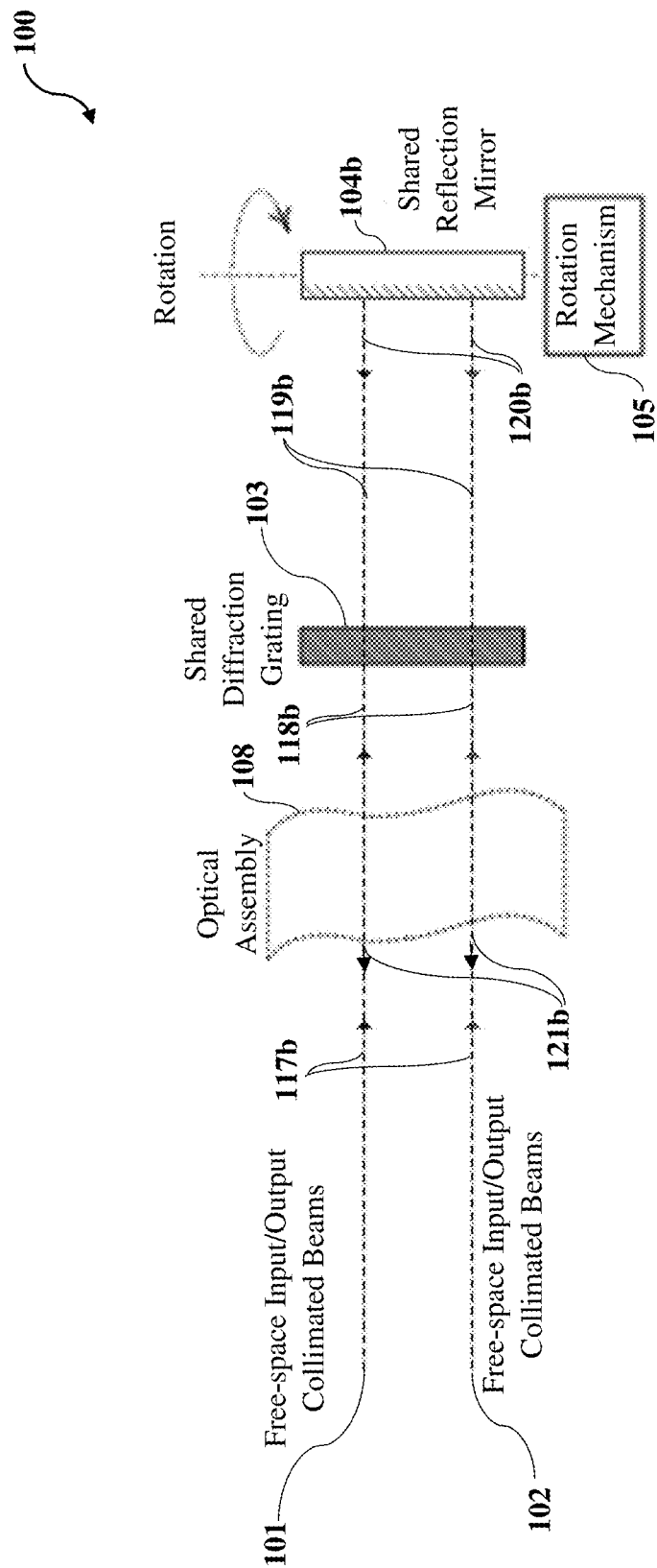
FIG. 3B exemplarily illustrates another embodiment of the synchronous, tunable multi-optical filter system comprising two tunable optical filters, a shared diffraction grating, and a shared reflection mirror.

FIG. 3B exemplarily illustrates another embodiment of the synchronous, tunable multi-optical filter system 100 comprising two tunable optical filters 101 and 102, a shared diffraction grating 103, and a shared reflection mirror 104b. This embodiment represents the reflection mode of the tunable optical filters 101 and 102. In this embodiment, the input elements of the first tunable optical filter 101 and the second tunable optical filter 102 comprise input sources disposed in a free space optical connection to the shared diffraction grating 103, free of the optical fiber collimators 115 and 116 exemplarily illustrated in FIG. 3A. In this embodiment, the input sources are configured to pass free-space input collimated beams 117b to the shared diffraction grating 103 through free space.

The shared diffraction grating 103 is disposed in an optical path of the free-space input collimated beams 117b, 118b. In an embodiment, the shared diffraction grating 103 receives the free-space input collimated beams 117b from the input sources of the tunable optical filters 101 and 102. In another embodiment, if an optical assembly 108 is disposed between the shared diffraction grating 103 and the input sources of the tunable optical filters 101 and 102, the shared diffraction grating 103 receives the adjusted, free-space collimated beams 118b from the optical assembly 108. The shared diffraction grating 103 disperses each of the adjusted free-space collimated beams 118b into constituent wavelengths as disclosed in the description of FIG. 1A. In an embodiment, the dispersed beams 119b travel in a parallel orientation toward the shared reflection mirror 104b as exemplarily illustrated in FIG. 3B.

The shared reflection mirror 104b is disposed in the optical path of the dispersed beams 119b. The shared reflection mirror 104b reflects output beams 120b having target wavelengths selected from among the constituent wavelengths, back to the tunable optical filters 101 and 102 through free space, in the reflection mode. The rotation mechanism 105, operably coupled to and shared by the two tunable optical filters 101 and 102, facilitates synchronous tuning of the tunable optical filters 101 and 102. The rotation mechanism 105 rotates the shared reflection mirror 104b for selecting the target wavelengths of the output beams 120b as disclosed in the description of FIG. 1A. By rotating the shared reflection mirror 104b, the rotation mechanism 105 tunes the second tunable optical filter 102 synchronously with the first tunable optical filter 101 across a common tuning range such that a center wavelength of the first tunable optical filter 101 substantially matches with a center wavelength of the second tunable optical filter 102. The output beams 120b reflected by the shared reflection mirror 104b pass through the shared diffraction grating 103 and, in an embodiment, through the optical assembly 108 into free space as exemplarily illustrated in FIG. 3B, and are herein referred to as free space output collimated beams. In an embodiment, the shared diffraction grating 103 passes the output beams 120b having the target wavelengths to the optical assembly 108. The output beams 120b undergo a beam size adjustment at the optical assembly 108 as disclosed in the description of FIG. 2A. The output beams 121b exiting the optical assembly 108 thereafter pass through free space in the tunable optical filters 101 and 102 as free space output collimated beams. FIG. 3B shows the free space input collimated beams 117b being reflected by the shared reflection mirror 104b after undergoing beam adjustment and dispersion, and the reflected output beams 120b, 121b returning to the same locations in the tunable optical filters 101 and 102 as the free space input collimated beams 117b.

Figure 4A:
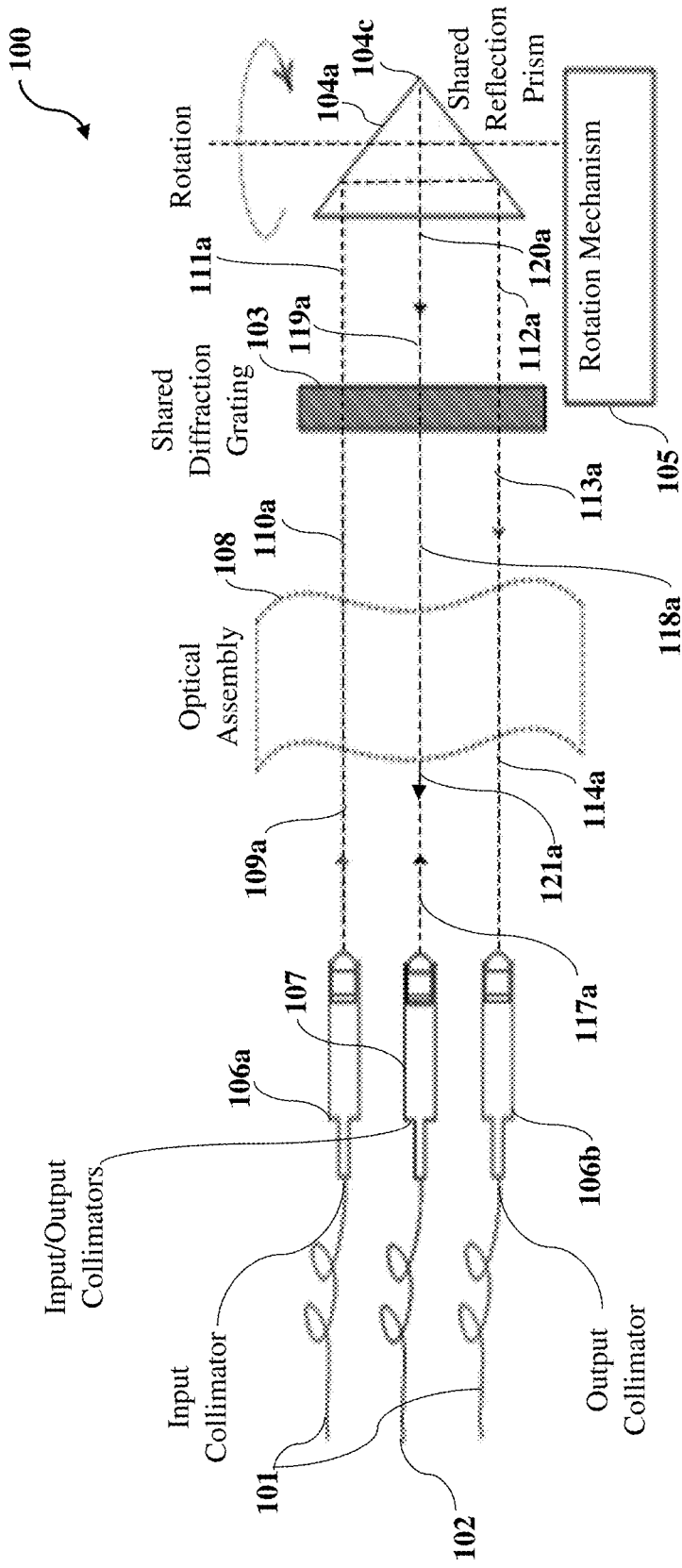
FIG. 4A exemplarily illustrates an embodiment of the synchronous, tunable multi-optical filter system operating in a hybrid mode comprising a reflection mode and a transmission mode.

FIG. 4A exemplarily illustrates an embodiment of the synchronous, tunable multi-optical filter system 100 operating in a hybrid mode comprising both a reflection mode and a transmission mode. In this embodiment, the synchronous, tunable multi-optical filter system 100 comprises one tunable optical filter 102 operating in a reflection mode, another tunable optical filter 101 operating in a transmission mode, a shared diffraction grating 103, and a shared reflection prism 104a. As exemplarily illustrated in FIG. 4A, the input element and the output element of the tunable optical filter 101 configured to operate in the transmission mode comprise an input collimator 106a and an output collimator 106b respectively. The tunable optical filter 102 configured to operate in the reflection mode comprises an optical fiber collimator 107 that operates as both an input collimator and an output collimator.

In addition to the collimators 106a, 106b, and 107, the shared diffraction grating 103, and the shared reflection prism 104a, in an embodiment, the synchronous, tunable multi-optical filter system 100 further comprises the optical assembly 108. In the transmission mode of the tunable optical filter 101, the collimated beam 109a from the input collimator 106a passes through the optical assembly 108 for beam size adjustment. The beam size-adjusted collimated beam 110a passes through the shared diffraction grating 103. The shared diffraction grating 103 disperses the beam size-adjusted collimated beam 110a into constituent wavelengths. The shared reflection prism 104a receives the dispersed collimated beam 111a. The rotation mechanism 105 rotates the shared reflection prism 104a to select a target wavelength and reflect an output beam 112a having the target wavelength to the output collimator 106b of the tunable optical filter 101. The reflected output beam 112a passes the shared diffraction grating 103. The output beam 113a exiting the shared diffraction grating 103 then passes to the optical assembly 108 for beam size adjustment. The beam size-adjusted output beam 114a exits the optical assembly 108 and passes to the output collimator 106b of the tunable optical filter 101 as exemplarily illustrated in FIG. 4A. FIG. 4A shows the output collimated beam 112a, 113a, 114a vertically shifted in position from the input collimated beam 109a, in the transmission mode.

In the reflection mode of the tunable optical filter 102, the collimated beam 117a from the optical fiber collimator 107 passes through the optical assembly 108 for beam size adjustment. The beam size-adjusted collimated beam 118a passes through the shared diffraction grating 103. The shared diffraction grating 103 disperses the beam size-adjusted collimated beam 118a into constituent wavelengths. The shared reflection prism 104a receives the dispersed collimated beam 119a. The rotation mechanism 105 rotates the shared reflection prism 104a to select a target wavelength and reflect an output beam 120a having the target wavelength back to the same optical fiber collimator 107 of the tunable optical filter 102. The center part 104c of the shared reflection prism 104a reflects the incident dispersed beam 119a such that the reflected output beam 120a is in the same position vertically as the incident dispersed beam 119a. The output beam 120a passes the shared diffraction grating 103 and thereafter passes to the optical assembly 108 for beam size adjustment. The beam size-adjusted output beam 121a exits the optical assembly 108 and passes to the same optical fiber collimator 107 of the tunable optical filter 102 as exemplarily illustrated in FIG. 4A. FIG. 4A shows the beam size-adjusted output collimated beam 121a in the same position as the input collimated beam 117a, in the reflection mode.

Figure 4B:
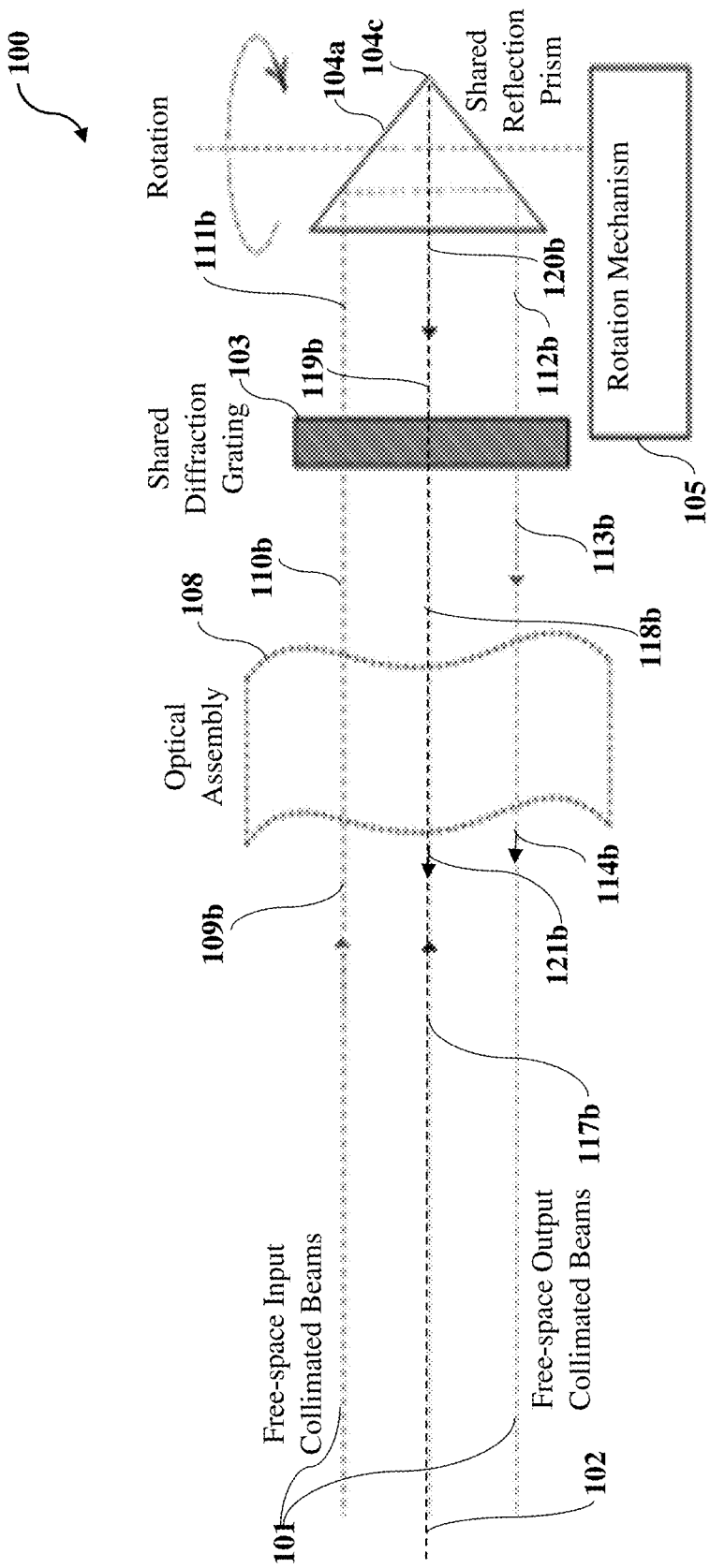
FIG. 4B exemplarily illustrates another embodiment of the synchronous, tunable multi-optical filter system operating in a hybrid mode comprising a reflection mode and a transmission mode.

FIG. 4B exemplarily illustrates another embodiment of the synchronous, tunable multi-optical filter system 100 operating in a hybrid mode comprising both a reflection mode and a transmission mode. In this embodiment, the synchronous, tunable multi-optical filter system 100 comprises one tunable optical filter 102 operating in a reflection mode, another tunable optical filter 101 operating in a transmission mode, a shared diffraction grating 103, and a shared reflection prism 104a. In this embodiment, the synchronous, tunable multi-optical filter system 100 is free of the collimators 106a, 106b, and 107 exemplarily illustrated in FIG. 4A.

In addition to the shared diffraction grating 103 and the shared reflection prism 104a, in an embodiment, the synchronous, tunable multi-optical filter system 100 further comprises the optical assembly 108. In the transmission mode of the tunable optical filter 101, a free-space input collimated beam 109b passes through the optical assembly 108 for beam size adjustment. The beam size-adjusted collimated beam 110b passes through the shared diffraction grating 103. The shared diffraction grating 103 disperses the beam size-adjusted collimated beam 110b into constituent wavelengths. The shared reflection prism 104a receives the dispersed collimated beam 111b. The rotation mechanism 105 rotates the shared reflection prism 104a to select a target wavelength and reflect an output beam 112b having the target wavelength to the tunable optical filter 101 through free space. The reflected output beam 112b passes the shared diffraction grating 103. The output beam 113b exiting the shared diffraction grating 103 passes to the optical assembly 108 for beam size adjustment. The beam size-adjusted output beam 114b exits the optical assembly 108 through free space as an adjusted free-space output collimated beam as exemplarily illustrated in FIG. 4B. FIG. 4B shows the free-space output collimated beam 112b, 113b, 114b vertically shifted in position from the free-space input collimated beam 109b, in the transmission mode.

In the reflection mode of the tunable optical filter 102, a free-space input collimated beam 117b passes through the optical assembly 108 for beam size adjustment. The beam size-adjusted collimated beam 118b passes through the shared diffraction grating 103. The shared diffraction grating 103 disperses the beam size-adjusted collimated beam 118b into constituent wavelengths. The shared reflection prism 104a receives the dispersed collimated beam 119b. The rotation mechanism 105 rotates the shared reflection prism 104a to select a target wavelength and reflect an output beam 120b having the target wavelength back to the tunable optical filter 102 through free space. The center part 104c of the shared reflection prism 104a reflects the incident dispersed beam 119b such that the reflected output beam 120b is in the same position vertically as the incident dispersed beam 119b. The output beam 120b passes the shared diffraction grating 103 and the optical assembly 108 and exits the optical assembly 108 through free space as an adjusted free-space output collimated beam 121b as exemplarily illustrated in FIG. 4B. FIG. 4B shows the adjusted free-space output collimated beam 121b in the same position as the free-space input collimated beam 117b, in the reflection mode.

FIG. 5 exemplarily illustrates a table showing combinations of communication modes in which two tunable optical filters 101 and 102 of the synchronous, tunable multi-optical filter system 100 shown in FIGS. 1A-1B, FIGS. 2A-2B, FIGS. 3A-3B, and FIGS. 4A-4B, are individually configured to operate. The communication modes in which the first tunable optical filter 101 and the second tunable optical filter 102 are individually configured to operate comprise a transmission mode and a reflection mode. In an embodiment, the transmission mode is a mode of operation of the tunable optical filter 101 or 102 where light or an optical beam passes through the tunable optical filter 101 or 102 typically comprising two optical fiber collimators, that is, an input collimator for an input beam and an output collimator for an output beam. In another embodiment, the transmission mode is a mode of operation of the tunable optical filter 101 or 102 with a free space input and a free space output for communicating a free space input beam and a free space output beam respectively. In the transmission mode, the input beam is separated from the output beam and after beam size adjustment, diffraction, and reflection, the output beam is transmitted to an output collimator of the tunable optical filter 101 or 102 or in an embodiment, through free space. In an embodiment, the reflection mode is a mode of operation of the tunable optical filter 101 or 102 where light or an optical beam passes through the tunable optical filter 101 or 102 typically comprising only one optical fiber collimator used as both an input collimator and an output collimator, and after beam size adjustment, diffraction, and reflection, the output beam is reflected the same way back into the same optical fiber collimator of the tunable optical filter 101 or 102. In another embodiment, the reflection mode is a mode of operation of the tunable optical filter 101 or 102 where light or an input beam passes through free space, and after beam size adjustment, diffraction, and reflection, the output beam is reflected the same way back to the tunable optical filter 101 or 102 through free space.

The tunable optical filters 101 and 102 of the synchronous, tunable multi-optical filter system 100 are set in the transmission mode or the reflection mode individually in different combinations as exemplarily illustrated in FIG. 5. In an embodiment, both the tunable optical filters 101 and 102 are individually configured to operate in the transmission mode. In another embodiment, the first tunable optical filter 101 is configured to operate in the transmission mode whereas the second tunable optical filter 102 is configured to operate in the reflection mode. In another embodiment, the first tunable optical filter 101 is configured to operate in the reflection mode whereas the second tunable optical filter 102 is configured to operate in the transmission mode. In another embodiment, both the tunable optical filters 101 and 102 are individually configured to operate in the reflection mode. The tunable optical filter 101 or 102 operates in the transmission mode if a shared reflection prism 104a is used as the shared rotatable optical component, which separates the input collimator 106a or 107a from the output collimator 106b or 107b exemplarily in FIG. 1A and FIGS. 2A-2B. In an embodiment, the tunable optical filter 101 or 102 operates in the transmission mode if the shared reflection prism 104a is used as the shared rotatable optical component, which separates the free-space input collimated beams 109b from the free-space output collimated beams 114b exemplarily in FIG. 1B. In the transmission mode, the shared reflection prism 104a is configured to shift the output beam from the input beam by a distance as exemplarily illustrated in FIGS. 1A-1B, FIGS. 2A-2B, and FIGS. 4A-4B.

The tunable optical filter 101 or 102 operates in the reflection mode if a shared reflection mirror 104b is used as the shared rotatable optical component, which reflects the output collimated beam 121a back to the same collimator, for example, the optical fiber collimator 115 or 116 exemplarily in FIG. 3A. In an embodiment, the tunable optical filter 101 or 102 operates in the reflection mode if the shared reflection mirror 104b is used as the shared rotatable optical component, which reflects the free-space output collimated beam 121b back to the same location as the free-space input collimated beam 117b exemplarily in FIG. 3B and FIG. 4B. In the reflection mode, either the shared reflection mirror 104b or the shared reflection prism 104a is configured to reflect the output beam back to the same location as the input beam as exemplarily illustrated in FIGS. 3A-3B and FIGS. 4A-4B.

Figure 6A:
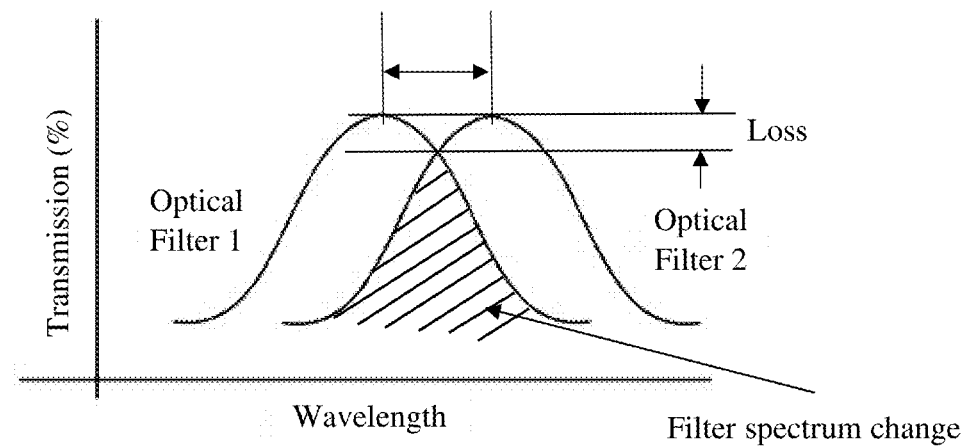
FIG. 6A (prior art) exemplarily illustrates a graphical representation showing a mismatch of center wavelengths of two tunable optical filters in a conventional optical filter system resulting in a substantial optical power loss and distortion in the shape of an output optical spectrum of the tunable optical filters.

FIG. 6A (prior art) exemplarily illustrates a graphical representation showing a mismatch of center wavelengths of two tunable optical filters, that is, optical filter 1 and optical filter 2, in a conventional optical filter system, resulting in a substantial optical power loss and distortion in the shape of an output optical spectrum of the tunable optical filters. In the conventional optical filter system, any slight center wavelength drift between the tunable optical filters 1 and 2 causes a mismatch of the center wavelengths of the tunable optical filters 1 and 2 and results in a substantial optical power loss of the tunable optical filters 1 and 2, and distortion in the shape of the output optical spectrum of the tunable optical filters 1 and 2 as exemplarily illustrated in FIG. 6A. The mismatch of the center wavelengths of the tunable optical filters 1 and 2, the resulting increase in the optical power loss of the tunable optical filters 1 and 2, and the filter spectrum change are exemplarily illustrated in FIG. 6A. In comparison, by using a shared diffraction grating 103 and by rotating a shared optical component, for example, a shared reflection prism 104a or a shared reflection mirror 104b, the tunable optical filters 101 and 102 in the synchronous, tunable multi-optical filter system 100 exemplarily illustrated in FIGS. 1A-4B, are synchronously tuned across a common tuning range such that the center wavelengths of the tunable optical filters 101 and 102 substantially match each other over a tuning range as exemplarily illustrated in FIG. 6B.

Figure 6B:
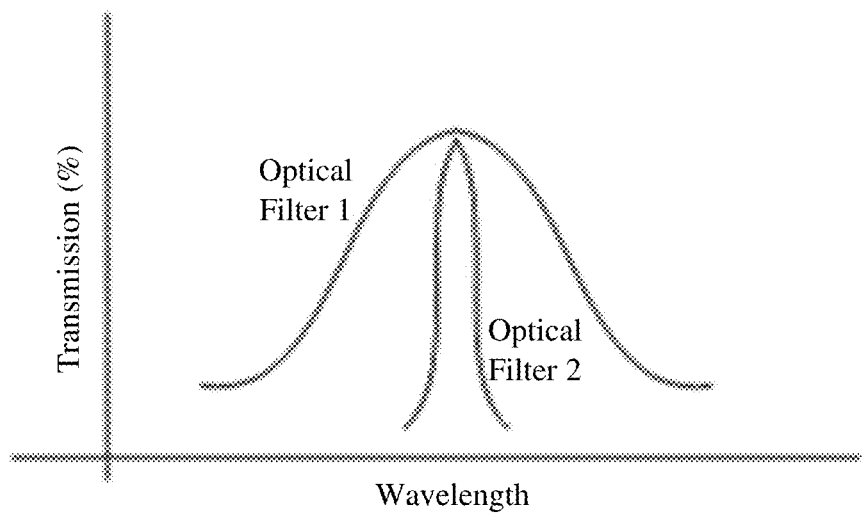
FIG. 6B exemplarily illustrates a graphical representation showing difference in bandwidths of the two tunable optical filters of the synchronous, tunable multi-optical filter system, while a center wavelength of the two tunable optical filters remains substantially the same over a tuning range.

FIG. 6B exemplarily illustrates a graphical representation showing difference in bandwidths of the two tunable optical filters, that is, optical filter 1 101 and optical filter 2 102, of the synchronous, tunable multi-optical filter system 100 shown in FIGS. 1A-1B, FIGS. 2A-2B, FIGS. 3A-3B, and FIGS. 4A-4B, while a center wavelength of the two tunable optical filters 101 and 102 remains substantially the same over a tuning range. In an embodiment, an optical assembly 108, for example, a beam expander comprising two lenses 108a and 108b exemplarily illustrated in FIGS. 2A-2B, is disposed in front of the shared diffraction grating 103a or 103b, for increasing the size of each collimated beam 109a or 109b. When the beam size increases, the bandwidth of the tunable optical filter 101 or 102 reduces by the same factor. The optical assembly 108 is, therefore, used to make the bandwidth of the tunable optical filters 101 and 102 different while the center wavelength of the tunable optical filters 101 and 102 is substantially the same over the tuning range. There are no additional limitations on the center wavelength or the tuning range of the synchronous, tunable multi-optical filter system 100 comprising two tunable optical filters 101 and 102 compared to a conventional optical filter system comprising a single filter structure. Through the use of the shared diffraction grating 103 and the shared rotatable optical component, for example, the shared reflection prism 104a or the shared reflection mirror 104b exemplarily illustrated in FIGS. 1A-1B, FIGS. 2A-2B, FIGS. 3A-3B, and FIGS. 4A-4B, any number of tunable optical filters, for example, two, three, four, or more tunable optical filters can be incorporated in the synchronous, tunable multi-optical filter system 100 and synchronized.

In the synchronous, tunable multi-optical filter system 100 disclosed herein, both optical tunable filters 101 and 102 have substantially the same center wavelength and substantially the same tuning range. The bandwidth of each of the optical tunable filters 101 and 102 not only depends on the beam size of the collimated beams 109a or 109b and parameters of the shared diffraction grating 103, but also on the optical assembly 108 used in the synchronous, tunable multi-optical filter system 100. Consider an example of a 1550 nm tunable optical filter having the following specifications: the size of the input beam is about 300 micrometers in diameter; the shared transmission grating 103a comprises about 966 lines per millimeter (mm); the 3 dB bandwidth of the tunable optical filter is about 0.2 nm; and the tuning range is about 150 nm. If an optical assembly 108 comprising a 10× cylindrical lens pair is used, the optical assembly 108 expands the input beam in one dimension into a 0.3 mm×3 mm elliptical beam shape, which reduces the bandwidth to nm and the tuning range remains substantially the same. In an embodiment, the optical assembly 108 selected for the first tunable optical filter 101 is different from the optical assembly 108 selected for the second tunable optical filter 102. In an example, the optical assembly 108 comprises a pair of cylindrical lenses configured to expand the input beam in one dimension to five (5) times its original beam size, while another dimension of the input beam remains unchanged. In another example, the optical assembly 108 comprises a pair of cylindrical lenses configured to expand the input beam in one dimension to ten (10) times its original beam size, while another dimension of the input beam remains unchanged. When two different optical assemblies 108 are selected for the first tunable optical filter 101 and the second tunable optical filter 102, the bandwidth is different for the two tunable optical filters 101 and 102 while the center wavelength and the tuning range are substantially the same. FIG. 6B exemplarily illustrates different bandwidths for the synchronously tuned optical filters 101 and 102. The synchronous tuning of the tunable optical filters 101 and 102 across a common tuning range such that the center wavelengths of the tunable optical filters 101 and 102 substantially match each other eliminates center wavelength drift between the tunable optical filters 101 and 102 and reduces the optical power loss of the tunable optical filters 101 and 102 and the distortion in the output optical spectrum shape of the tunable optical filters 101 and 102 as exemplarily illustrated in FIG. 6B.

FIG. 7A exemplarily illustrates an embodiment of the synchronous, tunable multi-optical filter system 100 comprising three tunable optical filters 101, 102, and 123, a shared diffraction grating 103, and a shared reflection prism 104a. In this embodiment, the synchronous, tunable multi-optical filter system 100 comprises a first tunable optical filter 101, a second tunable optical filter 102, and a third tunable optical filter 123, herein collectively referred to as "tunable optical filters". The synchronous, tunable multi-optical filter system 100 with three tunable optical filters 101, 102, and 123 using the same diffraction grating 103 and the same reflection prism 104a is herein referred to as a "synchronous, tunable triple optical filter". In an application, the synchronous, tunable multi-optical filter system 100 comprising the three tunable optical filters 101, 102, and 123 is used in multi-stage, tunable laser amplification where out-of-band amplitude spontaneous emission (ASE) noise needs to be removed after each stage as disclosed in the description of FIG. 9. The second and third tunable optical filters 102 and 123 are disposed at predetermined locations proximal to the first tunable optical filter 101. The second and third tunable optical filters 102 and 123 are configured to be tuned synchronously with the first tunable optical filter 101 across a common tuning range such that the center wavelengths of the first tunable optical filter 101 and the second and third tunable optical filters 102 and 123 substantially match each other. For purposes of illustration, the disclosure herein refers to the synchronous, tunable multi-optical filter system 100 comprising two tunable optical filters 101 and 102 as exemplarily illustrated in FIGS. 1A-4B, and three tunable optical filters 101, 102, and 123 as exemplarily illustrated in FIGS. 7A-7B; however, the scope of the synchronous, tunable multi-optical filter system 100 disclosed herein is not limited to two or three tunable optical filters 101, 102, and 123, but may be extended to include any number of tunable optical filters as permitted by size requirements, wherein all the tunable optical filters are configured to be tuned synchronously across a common tuning range such that the center wavelengths of all the tunable optical filters substantially match each other.

The shared diffraction grating 103 of the synchronous, tunable multi-optical filter system 100 is disposed in an optical path of the collimated beams 109a received from input elements of the tunable optical filters 101, 102, and 123. The input elements comprise input sources of light passing through optical fibers in the tunable optical filters 101, 102, and 123. In an embodiment, in addition to the input sources, the input elements of the tunable optical filters 101, 102, and 123 comprise input collimators 106a, 107a, and 122a respectively, as exemplarily illustrated in FIG. 7A. The input collimators 106a, 107a, and 122a of the tunable optical filters 101, 102, and 123 respectively, are each configured to collimate an optical beam, for example, a laser beam, received from their respective input sources. In an embodiment, an optical assembly 108 is disposed between the shared diffraction grating 103 and the input collimators 106a, 107a, and 122a of the tunable optical filters 101, 102, and 123 respectively. The optical assembly 108 comprising, for example, a pair of cylindrical lenses 108a and 108b exemplarily illustrated in FIG. 2A, is configured to adjust the collimated beams 109a incident on the shared diffraction grating 103 such that bandwidths of the tunable optical filters 101, 102, and 123 are different, while the center wavelength and the tuning range of the first tunable optical filter 101 are common to the center wavelength and the tuning range of the second tunable optical filter 102 and the third tunable optical filter 123 respectively, as disclosed in the description of FIG. 2A.

The input collimators 106a, 107a, and 122a pass the collimated beams 109a to the shared diffraction grating 103. In an embodiment as exemplarily illustrated in FIG. 7A, after adjustment, the optical assembly 108 passes the adjusted collimated beams 110a to the shared diffraction grating 103. The diffraction grating 103 is common to and shared by the three tunable optical filters 101, 102, and 123, which facilitates synchronous tuning of the tunable optical filters 101, 102, and 123. The shared diffraction grating 103 is configured to disperse each of the collimated beams 110a into constituent wavelengths. In an embodiment, the dispersed beams 111a travel in a parallel orientation toward the shared reflection prism 104a as exemplarily illustrated in FIG. 7A.

The shared reflection prism 104a is disposed in the optical path of the dispersed beams 111a. The shared reflection prism 104a is configured to communicate output beams 112a having target wavelengths selected from among the constituent wavelengths, to output elements, that is, the output collimators 106b, 107b, and 122b of the tunable optical filters 101, 102, and 123 respectively. The shared reflection prism 104a separates the input collimators 106a, 107a, and 122a from the output collimators 106b, 107b, and 122b respectively, and transmits the output beams 112a having the target wavelengths to the output collimators 106b, 107b, and 122b of the tunable optical filters 101, 102, and 123 respectively, in the transmission mode. The output beams 112a pass through the shared diffraction grating 103. The output beams 113a exiting from the shared diffraction grating 103 pass through the optical assembly 108, undergo beam size adjustment, and exit from the optical assembly 108 as beam adjusted output beams 114a. In another embodiment, one or more of the tunable optical filters 101, 102, and 123 operate in the reflection mode using a shared reflection mirror 104b as disclosed in the description of FIGS. 3A-3B and FIGS. 4A-4B. In the reflection mode, the shared reflection mirror 104b reflects the output beams 112a, 113a, 114a having the target wavelengths back to the same optical fiber collimators of the tunable optical filters 101, 102, and 123.

The rotation mechanism 105 of the synchronous, tunable multi-optical filter system 100 is operably coupled to and shared by the three tunable optical filters 101, 102, and 123, which facilitates synchronous tuning of the three tunable optical filters 101, 102, and 123. The rotation mechanism 105 is configured to rotate the shared reflection prism 104a for selecting the target wavelengths of the output beams 112a as disclosed in the description of FIG. 1A. In an embodiment, the output collimators 106b, 107b, and 122b of the tunable optical filters 101, 102, and 123 respectively, are configured to further tune the target wavelengths of the output beams 114a as disclosed in the description of FIG. 1A.

FIG. 7B exemplarily illustrates another embodiment of the synchronous, tunable multi-optical filter system 100 comprising three tunable optical filters 101, 102, and 123, a shared diffraction grating 103, and a shared reflection prism 104a. The synchronous, tunable multi-optical filter system 100 with the three tunable optical filters 101, 102, and 123 using the same diffraction grating 103 and the same reflection prism 104a, as illustrated in this embodiment, is herein referred to as a "synchronous, tunable triple optical free-space filter". In this embodiment, the input elements of the first tunable optical filter 101, the second tunable optical filter 102, and the third tunable optical filter 123 comprise input sources disposed in a free space optical connection to the shared diffraction grating 103, free of the input collimators 106a, 107a, and 122a exemplarily illustrated in FIG. 7A.

In this embodiment, the input sources are configured to pass free-space input collimated beams 109b to the shared diffraction grating 103 through free space.

The shared diffraction grating 103 is disposed in an optical path of the free-space collimated beams 109b. The shared diffraction grating 103 receives the free-space collimated beams 109b from the input sources of the tunable optical filters 101, 102, and 123. In an embodiment, an optical assembly 108 is disposed between the shared diffraction grating 103 and the input sources of the tunable optical filters 101, 102, and 123. The optical assembly 108 comprising, for example, a pair of lenses 108a and 108b exemplarily illustrated in FIGS. 2A-2B, adjusts the free-space collimated beams 109b incident on the shared diffraction grating 103 such that bandwidths of the tunable optical filters 101, 102, and 123 are different, while the center wavelength and the tuning range of the first tunable optical filter 101 are common to the center wavelength and the tuning range of the second tunable optical filter 102 and the third tunable optical filter 123 respectively. In this embodiment, the shared diffraction grating 103 receives the adjusted free-space collimated beams 110b from the optical assembly 108. The shared diffraction grating 103 disperses each of the free-space collimated beams 110b into constituent wavelengths as disclosed in the description of FIG. 1A. In an embodiment, the dispersed beams 111b travel in a parallel orientation toward the shared reflection prism 104a as exemplarily illustrated in FIG. 7B. The shared reflection prism 104a is disposed in the optical path of the dispersed beams 111b. The shared reflection prism 104a communicates output beams 112b having target wavelengths selected from among the constituent wavelengths, through free space in the tunable optical filters 101, 102, and 123.

The rotation mechanism 105, operably coupled to and shared by the three tunable optical filters 101, 102, and 123, facilitates synchronous tuning of the tunable optical filters 101, 102, and 123. The rotation mechanism 105 rotates the shared reflection prism 104a for selecting the target wavelengths of the output beams 112b as disclosed in the description of FIG. 1A. By rotating the shared reflection prism 104a, the rotation mechanism 105 tunes the second and third tunable optical filters 102 and 123 synchronously with the first tunable optical filter 101 across a common tuning range such that a center wavelength of the first tunable optical filter 101 substantially matches with a center wavelength of the second and third tunable optical filters 102 and 123. In an embodiment, the shared reflection prism 104a reflects the output beams 112b having the target wavelengths to the shared diffraction grating 103. The output beams 113b exiting the shared diffraction grating 103, in an embodiment, pass through the optical assembly 108. The optical assembly 108 adjusts the size of the output beams 113b and passes the beam adjusted output beams 114b through free space in the tunable optical filters 101, 102, and 123 as free-space output collimated beams.

Figure 8:
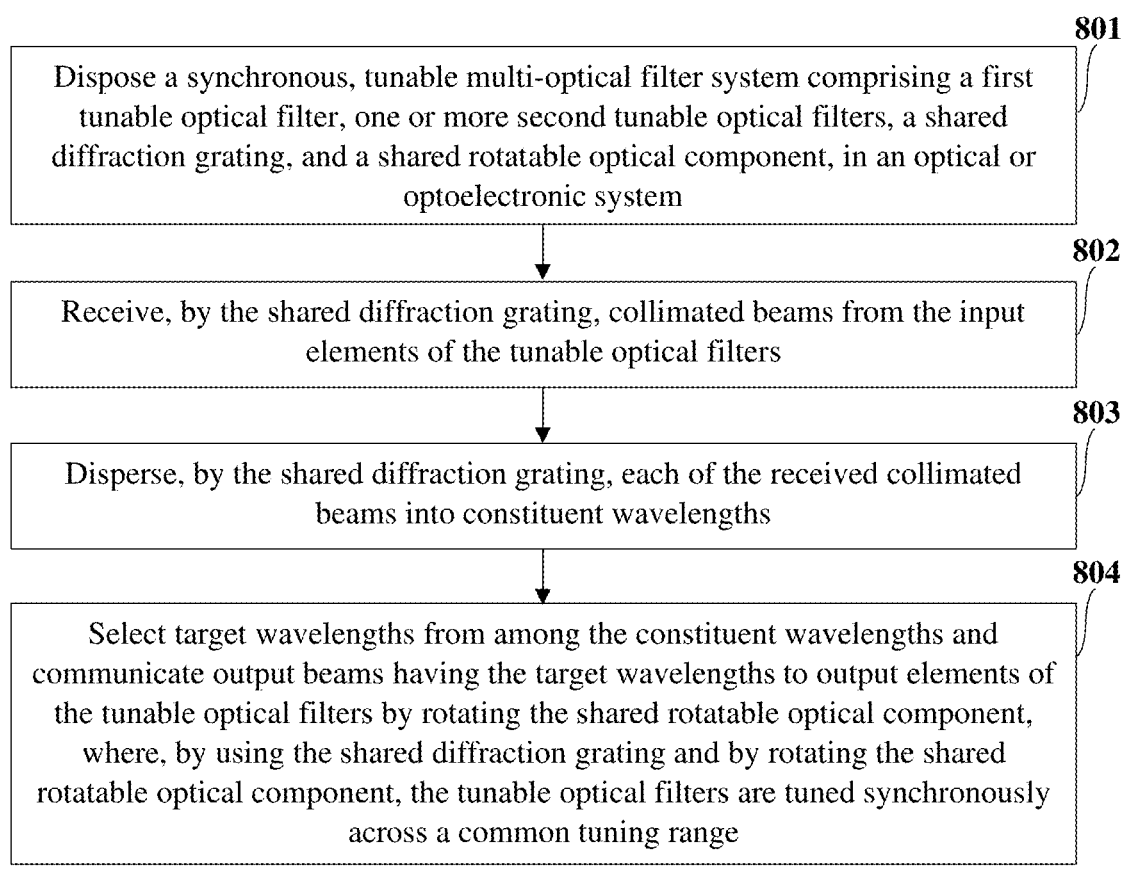
FIG. 8 illustrates a flowchart of a method for synchronously tuning wavelengths of output beams in optical and/or optoelectronic systems using the synchronous, tunable multi-optical filter system.

FIG. 8 illustrates a flowchart of a method for synchronously tuning wavelengths of output beams in optical and/or optoelectronic systems using the synchronous, tunable multi-optical filter system 100. In the method disclosed herein, the synchronous, tunable multi-optical filter system 100 comprising multiple tunable optical filters, for example, two tunable optical filters 101 and 102 as exemplarily illustrated in FIGS. 1A-1B, FIGS. 2A-2B, FIGS. 3A-3B, and FIGS. 4A-4B, three tunable optical filters 101, 102, and 123 as exemplarily illustrated in FIGS. 7A-7B, or any number of tunable optical filters, a shared diffraction grating 103, and a shared rotatable optical component such as a shared reflection prism 104a or a shared reflection mirror 104b exemplarily illustrated in FIGS. 1A-1B, FIGS. 3A-3B, FIGS. 4A-4B, and FIGS. 7A-7B, is disposed 801 in an optical and/or optoelectronic system. Furthermore, in the method disclosed herein, the shared diffraction grating 103 receives 802 collimated beams from the input elements of the tunable optical filters 101, 102, 123, etc., and disperses 803 each of the received collimated beams into constituent wavelengths. By rotating the shared rotatable optical component 104a or 104b, target wavelengths are selected 804 from among the constituent wavelengths and output beams having the target wavelengths are communicated by the shared rotatable optical component 104a or 104b to the output elements of the tunable optical filters 101, 102, 123, etc. By using the shared diffraction grating 103 and by rotating the shared rotatable optical component 104a or 104b, the tunable optical filters 101, 102, 123, etc., are tuned synchronously across a common tuning range such that the center wavelengths of the tunable optical filters 101, 102, 123, etc., substantially match each other.

Figure 9:
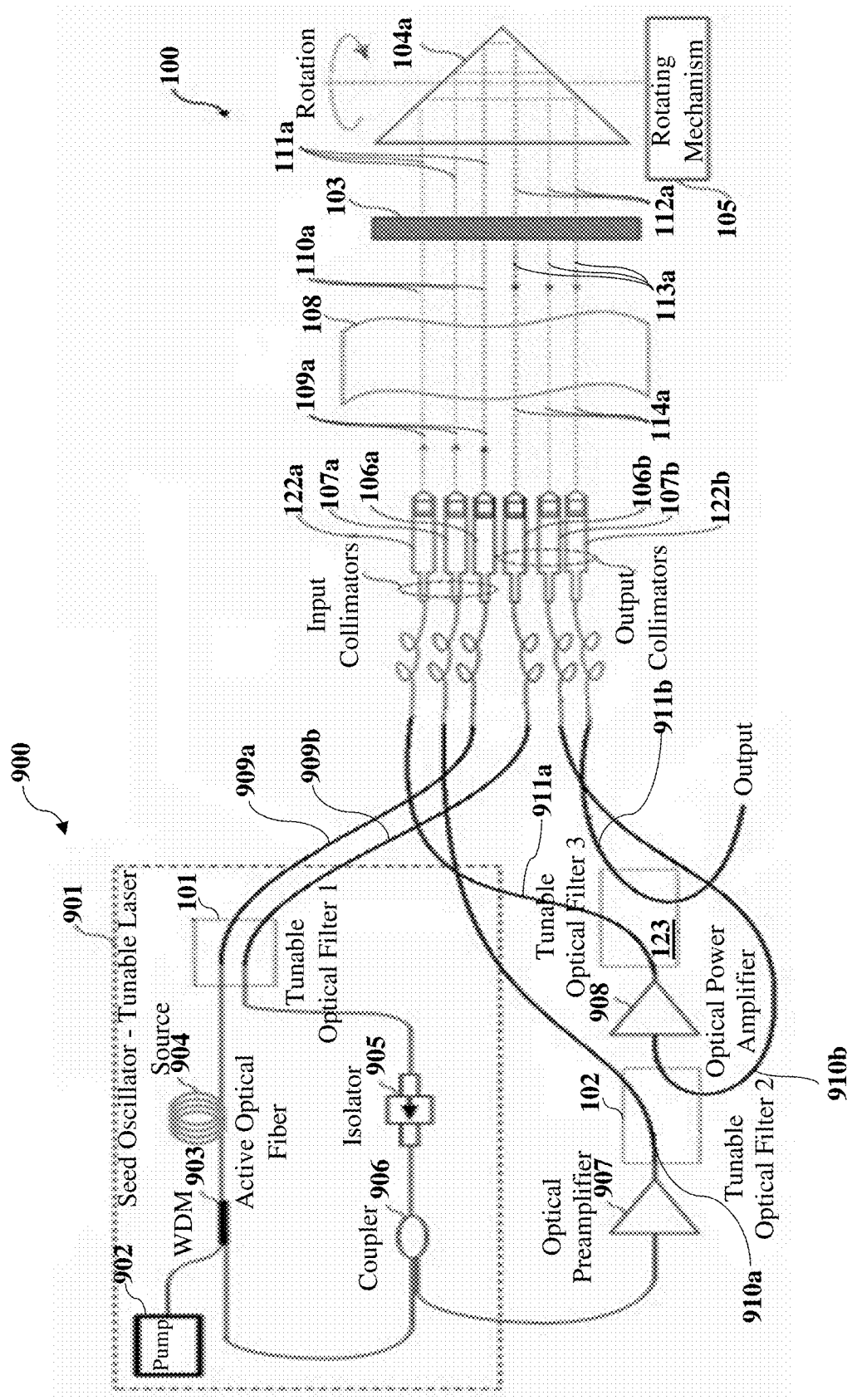
FIG. 9 exemplarily illustrates a block diagram showing integration of multiple tunable optical filters of the synchronous, tunable multi-optical filter system in a fiber laser system comprising a seed oscillator and two amplifier stages for reducing amplified spontaneous emission noise generated by the seed oscillator, the first amplifier stage, and the second amplifier stage.

FIG. 9 exemplarily illustrates a block diagram showing integration of multiple tunable optical filters 101, 102, and 123 of the synchronous, tunable multi-optical filter system 100 in a fiber laser system 900 comprising a seed oscillator 901 and two amplifier stages for reducing amplified spontaneous emission (ASE) noise generated by the seed oscillator 901, the first amplifier stage, and the second amplifier stage. In an embodiment, three tunable optical filters 101, 102, and 123 are used and synchronized in the fiber laser system 900 with two amplifier stages that implement two stages of amplification. The three tunable optical filters 101, 102, and 123 operate synchronously for removing the ASE noise from the seed oscillator 901, the first amplifier stage, and the second amplifier stage. The second tunable optical filter 102 and the third tunable optical filter 123 are disposed at predetermined locations proximal to the first tunable optical filter 101. For example, the first tunable optical filter 101 is disposed in the seed oscillator 901 configured as a tunable laser source; the second tunable optical filter 102 is disposed in a first amplifier stage comprising a first stage amplifier, for example, an optical preamplifier 907; and the third tunable optical filter 123 is disposed in a second amplifier stage comprising the optical power amplifier 908. The optical preamplifier 907 executes a first stage of amplification, and the optical power amplifier 908 executes a second stage of amplification as disclosed below. All three optical tunable filters 101, 102, and 123 use the same diffraction grating 103, for example, a transmission grating, and the same rotatable optical component, for example, a reflection prism 104a, but use different optical fiber collimators 106a, 106b, 107a, 107b, and 122a, 122b respectively, such that the optical tunable filters 101, 102, and 123 are synchronized at the same tuning wavelength at the same time. ASE noises in the optical preamplifier 907 and in the optical power amplifier 908 of the fiber laser system 900 are successfully suppressed as a result of a clean single peak produced at the output of this fiber laser system 900 with multiple amplifier stages.

In an embodiment as exemplarily illustrated in FIG. 9, the seed oscillator 901 comprises a pump laser source herein referred to as a pump 902, a wavelength division multiplexer (WDM) 903, an active optical fiber 904, the first tunable optical filter 101, an isolator 905, and a coupler 906. In this embodiment, a fiber optic transmission method such as wavelength division multiplexing is implemented for facilitating transmission of different optical signals simultaneously over a medium using multiple wavelengths of laser light. Wavelength division multiplexing combines multiple optical channels, each with a different wavelength, for transmitting different optical signals simultaneously through a single optical fiber. For amplification of a tunable laser beam generated by the seed oscillator 901, the coupler 906 is operably connected to the optical preamplifier 907 in the first amplifier stage. The optical preamplifier 907 is, for example, an ytterbium-doped fiber-based optical amplifier with a single mode, 980 nm pump laser. The optical preamplifier 907 is operably connected to an input of the second tunable optical filter 102. An output of the second tunable optical filter 102 is operably connected to the optical power amplifier 908 in the second amplifier stage. In an example, the optical power amplifier 908 comprises six multimode 980 nm pump laser sources, a pump combiner, and a double cladding ytterbium-doped fiber as the active optical fiber. The optical power amplifier 908 is further operably connected to an input of the third tunable optical filter 123. The first tunable optical filter 101 is used in the generation of the tunable laser beam, while the second tunable optical filter 102 and the third tunable optical filter 123 are used after the preamplifier and amplifier stages respectively. The first tunable optical filter 101, together with the pump 902, the WDM 903, and the active optical fiber 904 operate as a tunable laser seed or a tunable laser resonator.

The first tunable optical filter 101 receives an input signal light, that is, an input optical beam from the active optical fiber 904 of the seed oscillator 901, for example, through a single-mode polarization-maintaining fiber 909a, and passes the input optical beam to the input collimator 106a of the first tunable optical filter 101. The input collimator 106a collimates the input optical beam and passes the collimated beam 109a to the shared diffraction grating 103. In an embodiment as exemplarily illustrated in FIG. 9, after adjustment, the optical assembly 108 passes the adjusted collimated beam 110a to the shared diffraction grating 103. The shared diffraction grating 103 disperses the collimated beam 110a into constituent wavelengths. In an embodiment, the dispersed beam 111a travels in a parallel orientation towards the shared reflection prism 104a. The shared reflection prism 104a, disposed in the optical path of the dispersed beam 111a, reflects an output beam 112a having a target wavelength selected from among the constituent wavelengths, to the output collimator 106b of the first tunable optical filter 101. The output beam 112a passes through the shared diffraction grating 103. The output beam 113a exiting from the shared diffraction grating 103 passes through the optical assembly 108, undergoes beam size adjustment, and exits from the optical assembly 108 as a beam size-adjusted output beam 114a to enter the output collimator 106b of the first tunable optical filter 101. The output collimator 106b further collimates the beam size-adjusted output beam 114a and passes the output collimated beam to the isolator 905 of the seed oscillator 901, for example, through a single-mode polarization-maintaining fiber 909b. The isolator 905 transmits the output collimated beam to the coupler 906 in one direction. Based on the coupling ratio of the coupler 906, the coupler 906 outputs a predetermined percentage of the output collimated beam as seed light to the optical preamplifier 907.

The seed light from the seed oscillator 901 passes through the optical preamplifier 907 to increase the output power. The output of the optical preamplifier 907 is operably coupled to the input collimator 107a of the second tunable optical filter 102, for example, through a double-cladding 10/130 polarization-maintaining fiber 910a having a 10 micrometer (µm) core diameter and a 130 µm clad diameter. The input collimator 107a collimates the input preamplified seed light and passes the collimated beam 109a to the shared diffraction grating 103. In an embodiment as exemplarily illustrated in FIG. 9, after adjustment, the optical assembly 108 passes the adjusted collimated beam 110a to the shared diffraction grating 103. The shared diffraction grating 103 disperses the collimated beam 110a into constituent wavelengths. In an embodiment, the dispersed beam 111a travels in a parallel orientation towards the shared reflection prism 104a. The shared reflection prism 104a, disposed in the optical path of the dispersed beam 111a, reflects an output beam 112a having a target wavelength selected from among the constituent wavelengths, to the output collimator 107b of the second tunable optical filter 102. The output beam 112a passes through the shared diffraction grating 103. The output beam 113a exiting from the shared diffraction grating 103 passes through the optical assembly 108, undergoes beam size adjustment, and exits from the optical assembly 108 as a beam size-adjusted output beam 114a to enter the output collimator 107b of the second tunable optical filter 102. The output collimator 107b further collimates the beam size-adjusted output beam 114a and passes the output collimated beam to the input of the optical power amplifier 908, for example, through a double-cladding 10/130 polarization-maintaining fiber 910b.

The second tunable optical filter 102 is used to filter out the amplified spontaneous emission (ASE) noise such that the light after passing through the second tunable optical filter 102 is clean without ASE noise. The clean light then passes through the optical power amplifier 908. The third tunable optical filter 123 is used to remove the ASE noise generated by the optical power amplifier 908. The output of the optical power amplifier 908 is operably coupled to the input collimator 122a of the third tunable optical filter 123, for example, through a double-cladding 20/250 polarization-maintaining fiber 911a having a 20 micrometer (µm) core diameter and a 250 µm clad diameter. The input collimator 122a collimates the input amplified light and passes the collimated beam 109a to the shared diffraction grating 103. In an embodiment as exemplarily illustrated in FIG. 9, after adjustment, the optical assembly 108 passes the adjusted collimated beam 110a to the shared diffraction grating 103. The shared diffraction grating 103 disperses the adjusted collimated beam 110a into constituent wavelengths. In an embodiment, the dispersed beam 111a travels in a parallel orientation towards the shared reflection prism 104a. The shared reflection prism 104a, disposed in the optical path of the dispersed beam 111a, reflects an output beam 112a having a target wavelength selected from among the constituent wavelengths, to the output collimator 122b of the third tunable optical filter 123. The output beam 112a passes through the shared diffraction grating 103. The output beam 113a exiting from the shared diffraction grating 103 passes through the optical assembly 108, undergoes beam size adjustment, and exits from the optical assembly 108 as a beam size-adjusted output beam 114a to enter the output collimator 122b of the third tunable optical filter 123. The output collimator 122b further collimates the beam size-adjusted output beam 114a and passes the output collimated beam as the output of the fiber laser system 900, for example, through a double-cladding 20/250 polarization-maintaining fiber 911b.

The three tunable optical filters 101, 102, and 123 are synchronously tuned by rotating the shared rotatable optical component, for example, the shared reflection prism 104a, using the rotating mechanism 105, across a common tuning range such that the center wavelengths of the three tunable optical filters 101, 102, and 123 substantially match each other. The tunable laser beam travels in a loop configuration and as the seed oscillator 901 operates in the transmission mode, a circulator is not needed. By removing the out-of-band amplified spontaneous emission (ASE) noise after each amplification stage, the synchronous, tunable multi-optical filter system 100 achieves a high isolation of, for example, more than 70 decibels (dB), in the spectrum of the high-power output laser beam.

Consider an example for reducing amplified spontaneous emission noise (ASE) generated by the seed oscillator 901, the optical preamplifier 907 in the first amplifier stage, and the optical power amplifier 908 in the second amplifier stage, using multiple tunable optical filters 101, 102, and 123 of the synchronous, tunable multi-optical filter system 100. As exemplarily illustrated in FIG. 9, the seed oscillator 901, that is, the tunable laser source, comprises a loop structure, also referred to as a ring structure. The pump 902 is, for example, a single mode (SM), 980 nm pump laser. In another example, the pump 902 is a polarization mode (PM), 980 nm pump laser. The wavelength division multiplexer (WDM) 903 is, for example, a 980/1064 nm WDM. The WDM 903 is, for example, an SM fiber WDM. In another example, the WDM 903 is a PM fiber WDM. The active optical fiber 904 is, for example, an ytterbium-doped SM fiber. In another example, the active optical fiber 904 is an ytterbium-doped PM fiber. The isolator 905 is, for example, an SM fiber. In another example, the isolator 905 is a PM fiber.

The wavelength division multiplexer (WDM) 903 combines the pump laser and signal together. The active optical fiber 904 generates a signal light, for example, at a 1064 nm-wavelength range. The isolator 905 prevents back reflection of the signal and ensures the light travels in one direction. The coupling ratio of the coupler 906 is, for example, 40:60, 30:70, or any ratio between 10:90 and 50:50. In an example, with a coupling ratio of 40:60, the coupler 906 outputs 40% of light, while 60% of the light is routed into the loop structure of the seed oscillator 901. In another example, with a coupling ratio of 40:60, the coupler 906 outputs 60% of light, while 40% of the light is routed into the loop structure of the seed oscillator 901. The seed oscillator 901 is tuned, for example, in a 120 nm wavelength range at a center wavelength of 1064 nm to produce an output power of about milliwatts (mW) to 5 mW. After preamplification by the optical preamplifier 907, the output power increases, for example, to between about 2 mW and about 20 mW. The second tunable optical filter 102 is tuned synchronously with the first optical tunable filter 101 to remove the amplified spontaneous emission (ASE) noise generated by the optical preamplifier 907, and to reduce the signal light bandwidth, for example, from more than about 10 nm to about 0.4 nm. After power amplification by the optical power amplifier 908, the output power is, for example, from about 20 mW to several watts. The third tunable optical filter 123 is also tuned synchronously with the first optical tunable filter 101 to remove the ASE noise and reduce the output light bandwidth, for example, from about 10 nm to about 0.8 nm or less.

The rotation mechanism 105 of the synchronous, tunable multi-optical filter system 100 that is operably coupled to and shared by the three tunable optical filters 101, 102, and 123 facilitates synchronous tuning of the three tunable optical filters 101, 102, and 123. The rotation mechanism 105 rotates the shared reflection prism 104a for selecting the target wavelengths of the output beams 112a, 113a, 114a as disclosed in the description of FIG. 1A. Because the first tunable optical filter 101, the second tunable optical filter 102, and the third tunable optical filter 123 use the same diffraction grating 103 and the same reflection prism 104a, but only use different optical fiber collimators 106a, 106b, 107a, 107b, and 122a, 122b respectively, the three tunable optical filters 101, 102, and 123 are synchronized in their center wavelengths and bandwidths. The output signal produced by the optical power amplifier 908 achieves a high isolation of, for example, up to 70 dB by complete removal of the amplified spontaneous emission (ASE) noise from the amplifiers, that is, the optical preamplifier 907 and the optical power amplifier 908. Without synchronous tuning of the tunable optical filters 101, 102, and 123, the output signal achieves only about 10 dB to about 20 dB of isolation. The light bandwidth of the output signal also reduces, for example, from more than about 10 nm to less than about 1 nm because of the synchronous tuning of the tunable optical filters 101, 102, and 123.

The use of the same diffraction grating 103 and the same reflection prism 104a provides convenient and reliable control in synchronously tuning the tunable optical filters 101, 102, and 123. Mere rotation of the reflection prism 104a or another rotatable optical component such as a reflection mirror 104b exemplarily illustrated in FIGS. 3A-3B, shared by the tunable optical filters 101, 102, and 123, using the rotation mechanism 105, allows synchronous wavelength tuning and wavelength selection of the tunable optical filters 101, 102, and 123 as the optical fiber collimators 106a, 106b, 107a, 107b, and 122a, 122b of the tunable optical filters 101, 102, and 123 respectively, are aligned vertical to each other with respect to the shared diffraction grating 103 and the shared reflection prism 104a or another rotatable optical component such as the shared reflection mirror 104b. The incoming light, that is, the collimated beams 109a or 110a, from the optical fiber collimators 106a, 107a, and 122a of the tunable optical filters 101, 102, and 123 respectively, is focused at the same location horizontally but at a different location vertically on the shared diffraction grating 103, and the optical dispersion characteristics are the same in the vertical location, but different in the horizontal location of the shared diffraction grating 103. Similarly, the incoming light, that is, the collimated beams 111a, from the optical fiber collimators 106a, 107a, and 122a of the tunable optical filters 101, 102, and 123 respectively, is focused at the same location horizontally but at a different location vertically on the shared reflection prism 104a or another rotatable optical component such as the shared reflection mirror 104b, and the optical dispersion characteristics are the same in the vertical location, but different in the horizontal location of the shared reflection prism 104a or another rotatable optical component such as the shared reflection mirror 104b.

With reference to FIG. 9, as the second tunable optical filter 102 in the optical preamplifier 907 and the third tunable optical filter 123 in the optical power amplifier 908 are tuned synchronously with the first tunable optical filter 101, the amplified spontaneous emission (ASE) noise generated by the optical preamplifier 907 and the optical power amplifier 908 are removed by the second tunable optical filter 102 and the third tunable optical filter 123 respectively, thereby improving the efficiency of the optical preamplifier 907 and the optical power amplifier 908 and generating clean output optical spectrums without optical noise. Furthermore, the insertion loss of the tunable optical filters 101, 102, and 123 is reduced, for example, between about 2 dB and about 5 dB; and the bandwidth of the output optical spectrum is substantially narrower, for example, from about 2 nm-10 nm to about 0.1 nm of the tunable optical filters 101, 102, and 123.

Figure 10:
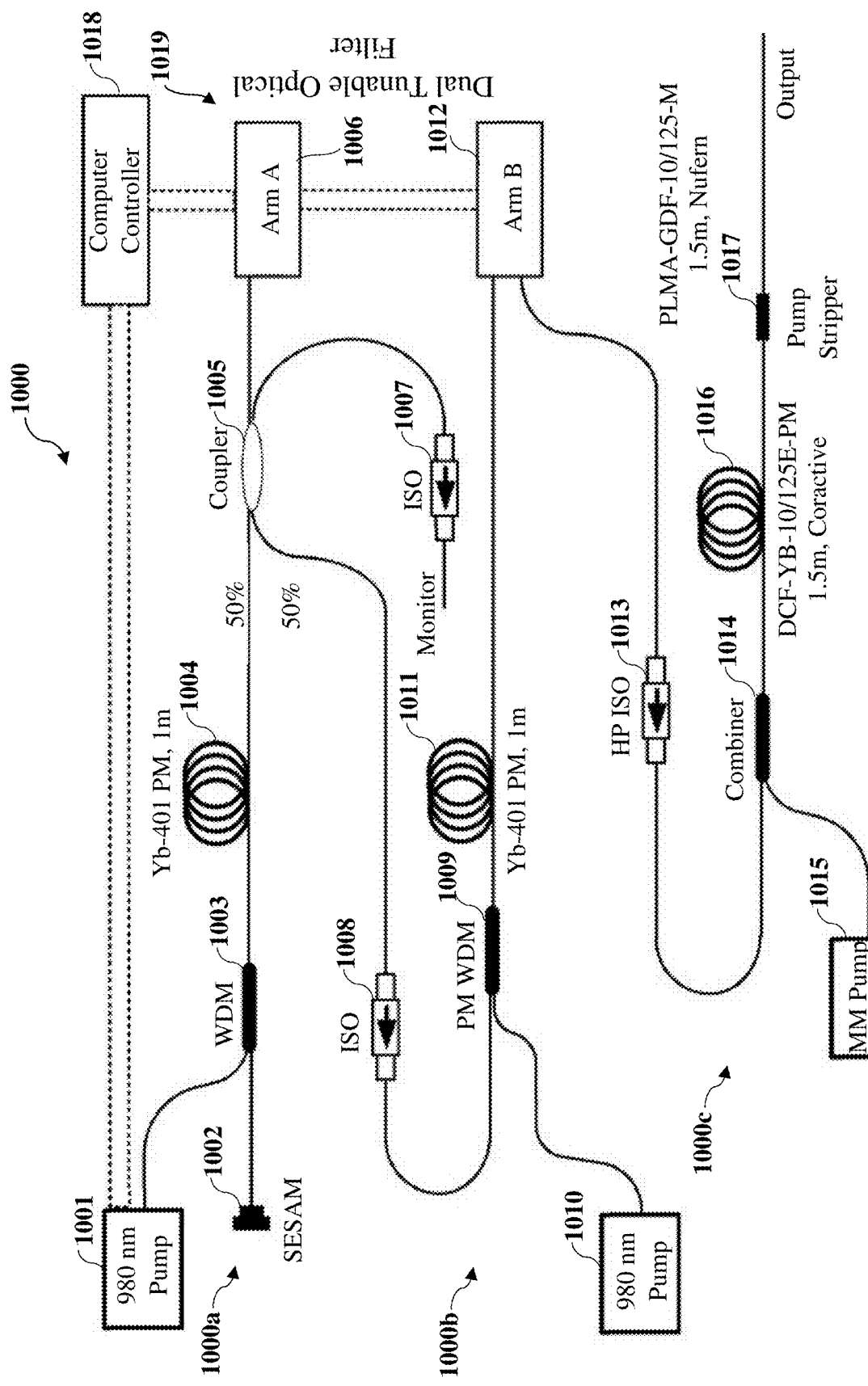
FIG. 10 exemplarily illustrates a block diagram of a wavelength-tunable, pulsed fiber laser system comprising a computer-controlled, motorized, dual tunable optical filter.

FIG. 10 exemplarily illustrates a block diagram of a wavelength-tunable, pulsed fiber laser (WTPFL) system 1000 comprising a computer-controlled, motorized, dual tunable optical filter 1019. The computer-controlled, motorized, dual tunable optical filter 1019 is integrated in the WTPFL system 1000 for selectively and automatically tuning wavelengths of output beams in a wide consecutive tuning range with high output power, a reduced amplified spontaneous emission (ASE) noise level, narrow linewidth, high precision, and less complexity. Consider an example where the computer-controlled, motorized, dual tunable optical filter 1019 is used with a consecutive wavelength-selective, all-fiber based mode-locked laser source covering a spectral range of about 70 nanometers (nm) at a 1 micrometer (μm) region. The WTPFL output beam generated by the WTPFL system 1000 is amplified directly to reach an average power of, for example, more than about 2 watts (W).

As exemplarily illustrated in FIG. 10, the wavelength-tunable, pulsed fiber laser (WTPFL) system 1000 comprises a seed stage 1000a for generating a WTPFL output beam, a preamplification stage 1000b, and a power amplification stage 1000c. The preamplification stage 1000b benefits a second arm, that is, arm B 1012, of the dual tunable optical filter 1019. The dual tunable optical filter 1019 is, for example, a dual tunable bandpass filter. In this example, both arms of the dual tunable optical filter 1019, that is, arm A 1006 used to select a tunable wavelength, and arm B 1012 used to reduce amplified spontaneous emission (ASE) noise generated in a first stage of amplification, that is, the preamplification stage 1000b, have the same bandwidth and are synchronously tuned using a shared diffraction grating, for example, a transmission grating (not shown in FIG. 10), and a shared rotatable optical component, for example, a shared reflection mirror (not shown in FIG. 10). The arms 1006 and 1012 are, for example, two parallel graded-index (GRIN) lenses. The shared reflection mirror is motorized and controlled by a computer controller 1018 to rotate and synchronously tune the dual tunable optical filter 1019. A 350-milliwatt (mW) single mode laser diode with a center wavelength of about 976 nm is used as a seed pump 1001 to pump an active optical fiber 1004, for example, a 1 m polarization maintaining (PM), YB 401 fiber, that is, an ytterbium (Yb)-doped single-clad fiber from Coractive High-Tech, Inc., with a core absorption of about 600 decibels per meter (dB/m) through a wavelength division multiplexer (WDM) 1003. The output power of this laser diode is varied as a function of wavelength to obtain a stable mode locking without pulse doubling. The other end of the gain medium, that is, the active optical fiber 1004, is connected to a coupler 1005, for example, a 2-by-2 3-dB coupler, and then connected to a graded-index (GRIN) collimator (not shown) of the dual tunable optical fiber 1019. One port of the coupler 1005 is used as an output transmitted through an isolator 1008 to a WDM 1009 of the preamplifier stage 1000b, and another port of the coupler 1005 is used as a monitoring port connected via an isolator 1007.

The transmission grating with a groove density of, for example, N=1000 grooves/mm, is used to spectrally disperse the bandwidth of the input optical beam and the motorized, reflection mirror then reflects the desired wavelength. The surface of the transmission grating is shared between two parallel GRIN lenses of the dual tunable optical filter 1019, that is, the arm 1006 used to select a tunable wavelength in the seed stage 1000a and the arm 1012 used to reduce the amplified spontaneous emission (ASE) noise generated in the preamplification stage 1000b, such that the filtered-out center wavelengths are substantially matched with each other. The bandwidth of the dual tunable optical filter 1019 is measured, for example, as 0.08 nm at 1064 nm. The signal port of the wavelength division multiplexer (WDM) 1003 is collimated and focused to the surface of a semiconductor-saturable absorber mirror (SESAM) 1002 with a modulation depth of, for example, about 26%, a saturation fluence of, for example, about 10 microjoules per centimeter square (µJ/cm2), and a relaxation time of, for example, about 45 pulses per second (ps). The generated signal is then amplified through the preamplifier stage 1000b comprising a WDM 1009 and an active optical fiber 1011, for example, a 1 m PM-Yb-401. A 980 nm pump 1010 pumps the active optical fiber 1011 through the WDM 1009. The amplified signal is then filtered out using the arm B 1012 of the dual tunable optical filter 1019 which is substantially matched with the center wavelength of the seed. The filtered amplified signal, without any ASE noise, is then connected to a signal port of a high-power combiner 1014 through a high power, low-loss isolator 1013 for further amplification. A piece of 1.5 m Yb-doped double-clad fiber (DCF) 1016, for example, the DCF-YB-Yb double-clad fiber of Coractive High-Tech, Inc., amplifies the signal to a watt-level output. In an embodiment, a piece of 1.2 m Yb-doped double-clad fiber (DCF) is used for amplifying the signal to a watt-level output. A multimode (MM) pump 1015 that provides a 10 W laser power at 980 nm is used to pump the Yb-DCF 1016. The power amplification stage 1000c further comprises a pump stripper 1017, for example, a PLMA-GDF-10/125-M of Nufern Corporation, where PLMA refers to a polarization maintaining large mode area and GDF refers to a germanium-doped fiber. The pump stripper 1017 removes an excess pump from the laser output.

Figure 11A:
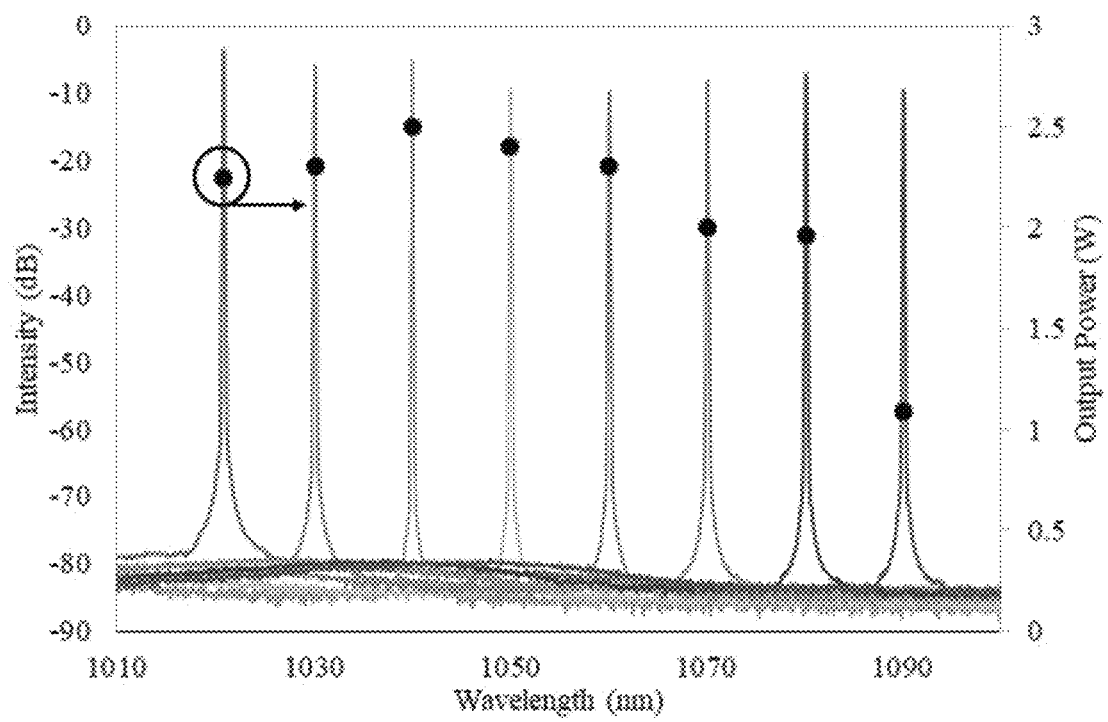
FIG. 11A exemplarily illustrates a graphical representation showing an output spectrum of the wavelength-tunable, pulsed fiber laser system over a wide spectral range.

FIG. 11A exemplarily illustrates a graphical representation showing an output spectrum of the wavelength-tunable, pulsed fiber laser (WTPFL) system 1000 shown in FIG. 10, over a wide spectral range, for example, from about 1020 nanometers (nm) to about 1090 nm measured with 10 nm spacing. The black dots exemplarily illustrated in FIG. 11A indicate the corresponding average output power. To continuously generate a WTPFL output over the whole range, for example, from about 1020 nm to about 1090 nm, the pump power of the seed is automatically adjusted as a function of wavelength since the gain is not flat in the whole range. The self-starting mode locking pulses are generated and last during the wavelength change by automatically tuning the dual tunable optical filter 1019 exemplarily illustrated in FIG. 10, that is, the dual tunable bandpass filter (BPF) with a tuning speed rate of, for example, about 5 nanometers per second (nm/s). The WTPFL system 1000 generates complete mode locking pulses the entire time without any distortion in the amplification stages 1000b and 1000c exemplarily illustrated in FIG. 10, to avoid any optical damage to the high-power components. To amplify the generated pulses, a wider pulse width is generated in the seed stage 1000a exemplarily illustrated in FIG. 10. By minimizing the bandwidth of the dual tunable optical filter 1019, for example, to about nm, the pulse width is limited by the time bandwidth product limitation. FIG. 11A exemplarily illustrates the tunability of the WTPFL output over the wide spectral range measured by an optical spectrum analyzer, for example, an AQ6370D optical spectrum analyzer (OSA) of Yokogawa Electric Corporation with a side-mode suppression ratio (SMSR) of, for example, more than about 75 decibels (dB). The mode locking pulses are generated, for example, from about 1020 nm to about 1090 nm, and then amplified so that the average output power and pulse energy reaches, for example, about 2.5 watts (W) and 76 nanojoule (nJ) at 1040 nm respectively. The power of the multimode pump 1015 in the last power amplifier stage 1000c exemplarily illustrated in FIG. 10, is kept constant, for example, at 6.2 W as indicated by the black dots in FIG. 11A.

Figure 11B:
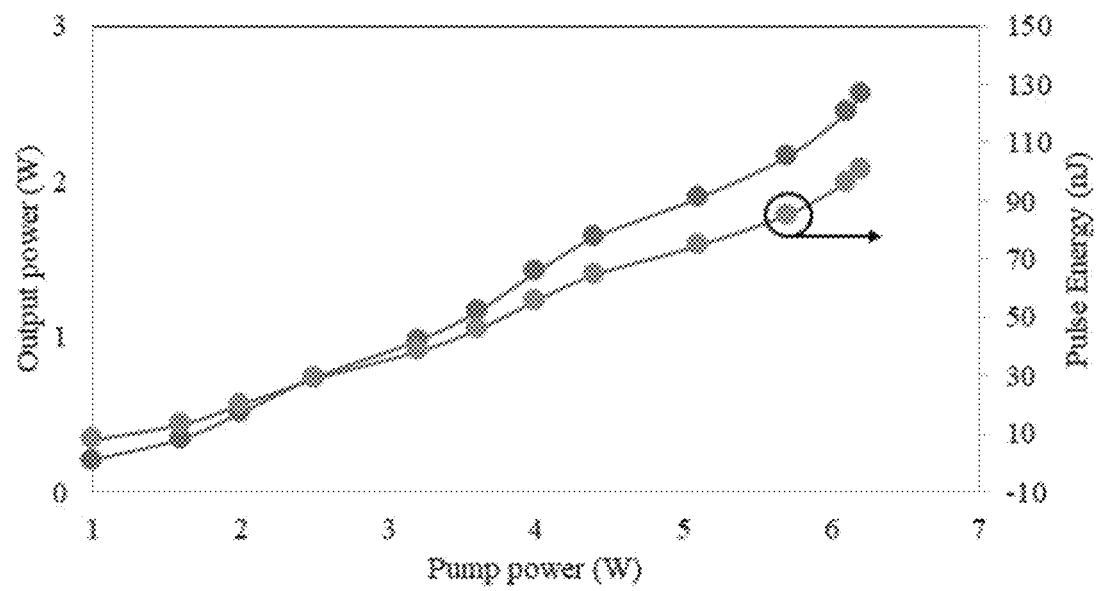
FIG. 11B exemplarily illustrates a graphical representation showing output optical power and pulse energy as a function of multimode laser diode pump power at an example wavelength.

FIG. 11B exemplarily illustrates a graphical representation showing output optical power and pulse energy as a function of multimode laser diode pump power at a wavelength of, for example, about 1040 nm. A slope conversion efficiency is, for example, about 34%.

Figure 12:
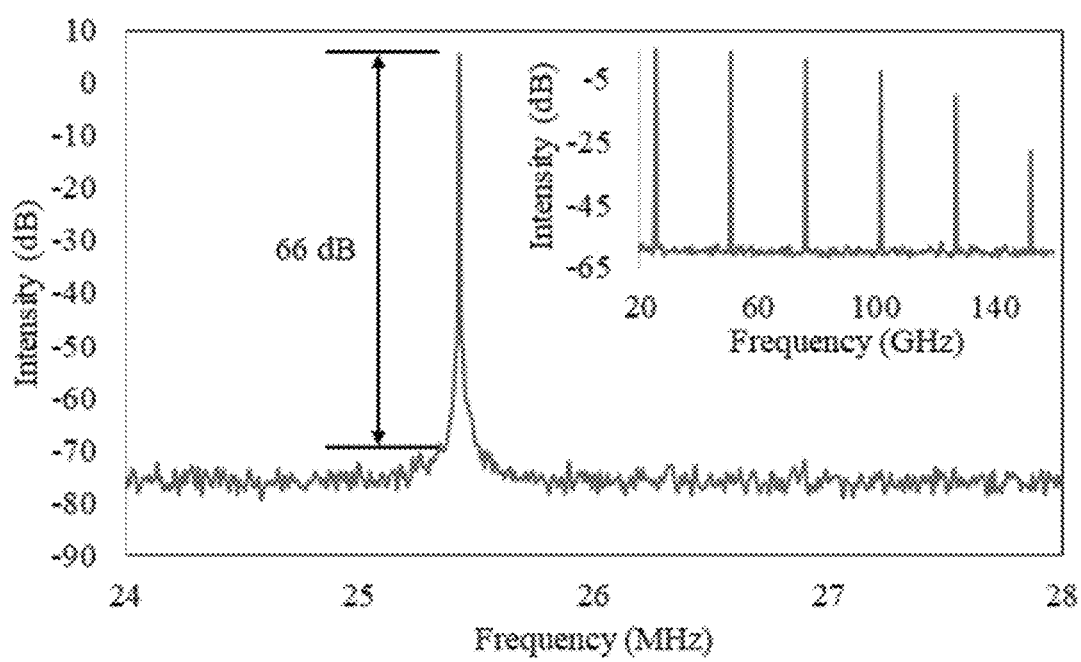
FIG. 12 exemplarily illustrates a graphical representation showing a radio frequency spectrum of the wavelength-tunable, pulsed fiber laser system at an example wavelength with an example resolution bandwidth.

FIG. 12 exemplarily illustrates a graphical representation showing a radio frequency (RF) spectrum of the wavelength-tunable, pulsed fiber laser (WTPFL) system 1000 shown in FIG. 10, at a wavelength of, for example, about 1040 nanometers (nm) with a resolution bandwidth (RBW) of, for example, about 1 kilohertz (kHz). An inset in FIG. 12 shows a 150 megahertz (MHz) wide-span spectrum with an RBW of, for example, about 100 kHz. The wavelength is measured by an RF spectrum analyzer, for example, the DSA 1030 RF spectrum analyzer of RIGOL Technologies, Inc., with a RBW of 1 kilohertz (kHz) and 100 kHz for the main graph and the inset respectively. The signal-to-noise ratio (SNR) is, for example, more than about 66 decibels (dB). A sharp RF peak at the fundamental beat is, for example, at about 25.4 megahertz (MHz), which is in agreement with the cavity length. The results disclosed herein show generation of clean and stable laser pulses. The frequencies (f) measured with the RF spectrum analyzer (RFSA) are, for example, about MHz and about 25.423 MHz at 1020 nm and 1030 nm respectively, and increase accordingly to reach about 25.434 MHz at 1090 nm. The refractive index of the fiber n=n(ω) is wavelength dependent and decreases by increasing wavelength. Since f=c/2 nL for a linear cavity structure, where "c" is the speed of light in a vacuum and "L" is round trip length of the cavity, the repetition rate of the pulse train increases slightly with increasing wavelengths due to chromatic dispersion.

Figure 13A:
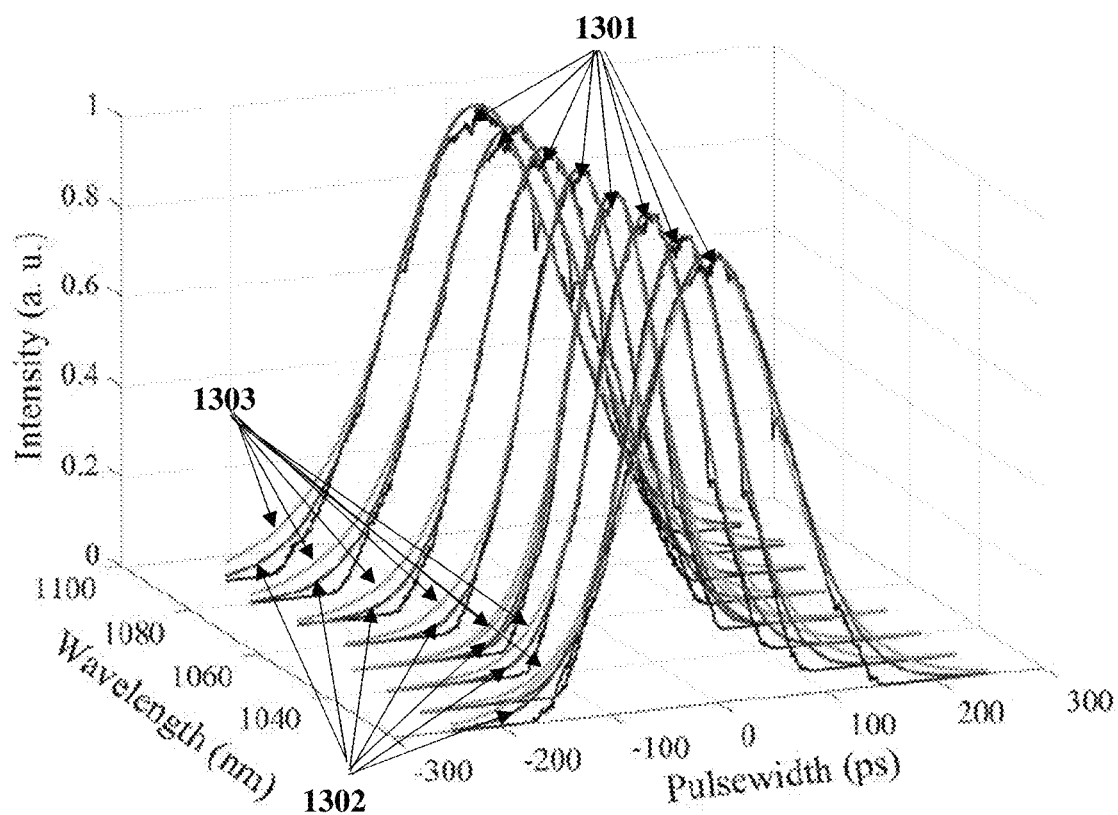
FIG. 13A exemplarily illustrates a graphical representation showing an autocorrelator pulse width measurement as a function of wavelength.

FIG. 13A exemplarily illustrates a graphical representation showing an autocorrelator pulse width measurement as a function of wavelength. In FIG. 13A, the arrows 1301 indicate the measured pulse width; the arrows 1302 indicate Sech2 fit; and the arrows 1303 indicate the Gaussian fit. The corresponding pulse width for each wavelength is measured by an autocorrelator, for example, the FR-103WS autocorrelator of Femtochrome Research, Inc., as exemplarily illustrated in FIG. 13A. At 1020 nanometers (nm), the Sech2 pulse width (PW) is, for example, about 103 ps, decreases to about 60 ps at 1050 nm, and again rises to about 122 ps at 1090 nm. In an embodiment, the minimum pulse width inside the cavity is calculated as follows.

$$\tau_p = \frac{1.76 D_2 \lambda_0 A_{eff,L}}{4\pi n_2 L_k} \frac{1}{E_p}$$

where $\tau_p$ is the full width at half maximum (FWHM) pulse duration, $\lambda_0$ is the center wavelength of the mode-locked pulse, $n_2$ is the nonlinear refractive index which for fused silica is 2.19 $10^{-20}$ m²/W at 1030 nm, and $L_k$ is the propagation length in the Kerr medium per round trip. The gain medium acts as the Kerr medium, so in a linear cavity $L_k$ is twice the length of the laser gain medium. $D_2$ denotes the amount of intracavity group delay dispersion (GDD) per round trip.

Figure 13B:
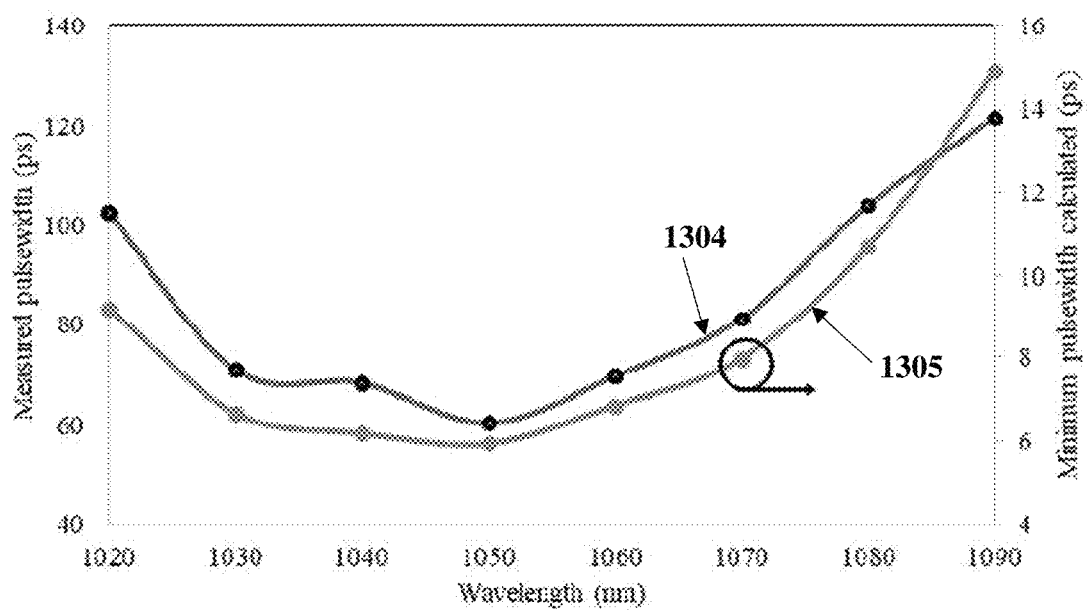
FIG. 13B exemplarily illustrates a graphical representation showing measured Sech2 pulse width versus a minimum calculated pulse width regardless of a bandwidth limitation.

FIG. 13B exemplarily illustrates a graphical representation showing measured Sech2 pulse width versus a minimum calculated pulse width regardless of a bandwidth limitation. In FIG. 13B, the arrow 1304 indicates the measured Sech² pulse width and the arrow 1305 indicates the minimum calculated pulse width. The pulse width indicated by the arrow 1304 is measured as a function of wavelength in comparison with the calculated pulse width indicated by the arrow 1305 regardless of bandwidth limitation. The measured pulse width trend is in an agreement with the calculated pulse width trend. Since the time-bandwidth product is constant and the bandwidth is filtered and limited in the example disclosed in FIG. 10, the generated pulse width is larger than the calculated pulse width as exemplarily illustrated in FIG. 13B.

Figure 14:
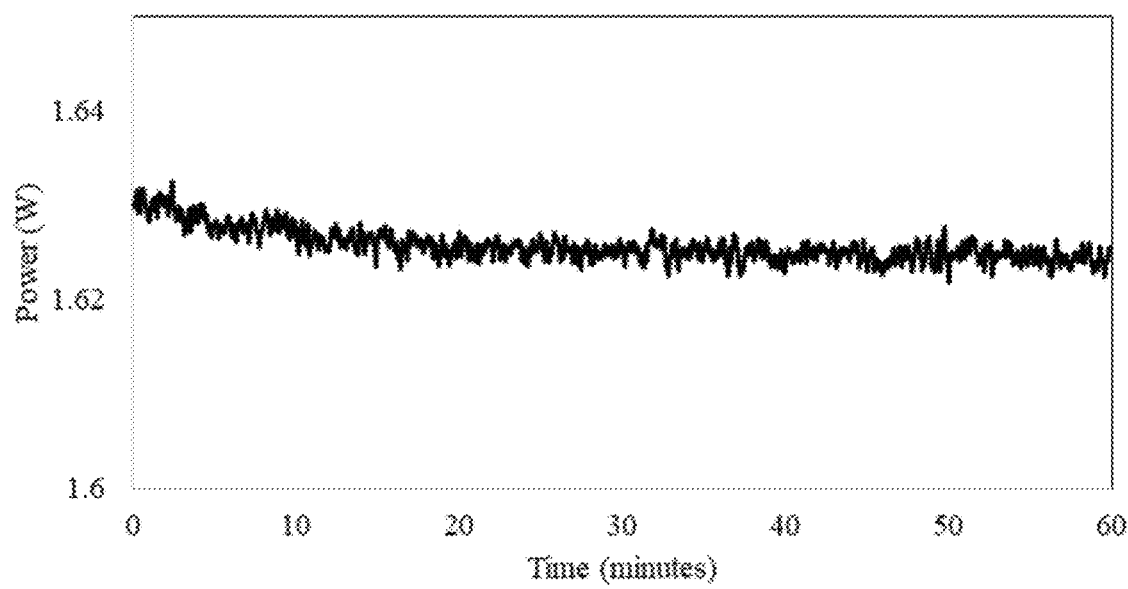
FIG. 14 exemplarily illustrates a graphical representation showing output power measurement stability over 60 minutes.

FIG. 14 exemplarily illustrates a graphical representation showing output power measurement stability over 60 minutes. The power stability is measured, for example, by a power meter of Ophir Optronics Ltd., over a period of 1 hour for a total of about 6000 reading points at 1040 nanometers (nm) while the output power is kept constant at about 1.63 watts (W). A standard deviation of about 0.1% is observed over the whole 1 hour. Utilizing the semiconductor-saturable absorber mirror (SESAM) 1002 exemplarily illustrated in FIG. 10, in the all-fiber laser source ensures both a picosecond pulse shaping regime and a robust self-starting mode-locked operation. The wavelength-tunable, pulsed fiber laser (WTPFL) system 1000 exemplarily illustrated in FIG. 10 generates the WTPFL output in an all-normal dispersion operation with no dispersion control elements used to manage the dispersion inside the seed cavity. The pulse width of the generated WTPFL output is broadened by interaction of normal group velocity dispersion and self-phase modulation (SPM), to limit the spectral bandwidth. Consequently, the nonlinearity is mitigated since the peak power of the pulses is decreased accordingly. The WTPFL system 1000 generates a consecutive tuning high-power WTPFL output in the range, for example, from about 1020 nm to 1090 nm, with a maximum average output power of, for example, about 2.5 W at 1040 nm while the Sech2 pulse width is, for example, about 68 ps. The generated WTPFL output can be consecutively tuned using the computer-controlled, motorized, dual tunable optical filter 1019 exemplarily illustrated in FIG. 10, with a speed of about 5 nm/s. The generated WTPFL Sech2 pulse width of about 60 ps to about 122 ps allows amplification of the pulses more efficiently with a slope efficiency of 34%.

Similar to the integration of the synchronous, tunable multi-optical filter system 100, for example, the dual tunable optical filter 1019, in the wavelength-tunable, pulsed fiber laser (WTPFL) system 1000 disclosed in FIGS. 10-14, the synchronous, tunable multi-optical filter system 100 is configured to be integrated in any fiber laser system including a wavelength-tunable, continuous fiber laser (WTCFL) system.

As exemplarily illustrated in FIGS. 1A-1B, FIGS. 2A-2B, FIGS. 3A-3B, FIGS. 4A-4B, and FIGS. 7A-7B, the synchronous, tunable multi-optical filter system 100 disclosed herein provides a simplified structure with multiple tunable optical filters, for example, 101, 102, 123, etc., using one diffraction grating 103 and one rotatable optical component, for example, a shared reflection prism 104a, a shared reflection mirror 104b, etc. Moreover, the synchronous, tunable multi-optical filter system 100 provides a convenient control mechanism where only one rotatable optical component, that is, the shared reflection prism 104a or the shared reflection mirror 104b, that is shared by multiple tunable optical filters, for example, 101, 102, 123, etc., needs to be rotated for synchronously tuning multiple tunable optical filters, for example, 101, 102, 123, etc. Furthermore, in an embodiment, the synchronous, tunable multi-optical filter system 100 allows synchronous tuning of multiple tunable optical filters, for example, 101, 102, 123, etc., automatically without any additional electronics or software to control different tunable optical filters, for example, 101, 102, 123, etc. Furthermore, by reducing the number of diffraction gratings and reflection prisms or mirrors to one each and by reducing the number of rotation mechanisms, for example, tuning stepper motors, stepper motor drivers, etc., the cost of the synchronous, tunable multi-optical filter system 100 is substantially reduced. Furthermore, the synchronous, tunable multi-optical filter system 100 is easily integrated in any fiber laser system for multiple applications, for example, in nonlinear microscopy, nonlinear fiber lasers, spectroscopy, micromachining, biology, medicine, etc., where wavelengths of output beams need to be selectively and automatically tuned in a wide consecutive tuning range with high output power, reduced amplified spontaneous emission (ASE) noise, narrow linewidth, high precision, and less complexity.

The foregoing examples and illustrative implementations of various embodiments have been provided merely for explanation and are in no way to be construed as limiting of the embodiments disclosed herein. Dimensions of various parts of the system disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A synchronous, tunable multi-optical filter system comprising:
 a first tunable optical filter;
 one or more second tunable optical filters disposed at one or more predetermined locations proximal to the first tunable optical filter;
 a shared diffraction grating disposed in optical paths of both the first tunable optical filter and the one or more second tunable optical filters, wherein the shared diffraction grating is configured to receive collimated beams from input elements of the first tunable optical filter and the one or more second tunable optical filters, and wherein the shared diffraction grating is configured to disperse each of the collimated beams into constituent wavelengths; and
 a shared rotatable optical component disposed at a predetermined distance from the shared diffraction grating, wherein the shared rotatable optical component is configured to receive the dispersed each of the collimated beams and communicate output beams having target wavelengths selected from among the constituent wavelengths, to output elements of the first tunable optical filter and the one or more second tunable optical filters operating in individually configurable communication modes; and
 wherein each of the one or more second tunable optical filters is tuned synchronously with the first tunable optical filter across a common tuning range by using the shared diffraction grating and by rotating the shared rotatable optical component such that a center wavelength of the first tunable optical filter substantially matches with a center wavelength of the each of the one or more second tunable optical filters.

2. The synchronous, tunable multi-optical filter system of claim 1, wherein the shared diffraction grating is selected from one of a transmission grating and a reflection grating.

3. The synchronous, tunable multi-optical filter system of claim 1, wherein the communication modes in which the first tunable optical filter and the one or more second tunable optical filters are individually configured to operate comprise a transmission mode and a reflection mode.

4. The synchronous, tunable multi-optical filter system of claim 1, wherein each of the input elements of the first tunable optical filter and the one or more second tunable optical filters comprises an input collimator configured to collimate an optical beam received from an input source, and wherein each of the output elements of the first tunable optical filter and the one or more second tunable optical filters comprises an output collimator configured to further tune the target wavelengths of the output beams.

5. The synchronous, tunable multi-optical filter system of claim 1, wherein the shared rotatable optical component is a reflection prism configured to separate the dispersed each of the collimated beams from the output beams and transmit the output beams having the target wavelengths to the output elements of the first tunable optical filter and the one or more second tunable optical filters in a transmission mode selected from the individually configurable communication modes.

6. The synchronous, tunable multi-optical filter system of claim 1, wherein the shared rotatable optical component is a mirror configured to reflect the output beams having the target wavelengths back to the input elements of the first tunable optical filter and the one or more second tunable optical filters in a reflection mode selected from the individually configurable communication modes.

7. The synchronous, tunable multi-optical filter system of claim 1, wherein each of the input elements of the first tunable optical filter and the one or more second tunable optical filters comprises an input source disposed in a free space optical connection to the shared diffraction grating, and wherein the input source is configured to pass the each of the collimated beams to the shared diffraction grating through free space.

8. The synchronous, tunable multi-optical filter system of claim 1, further comprising an optical assembly disposed between the shared diffraction grating and the input elements of the first tunable optical filter and the one or more second tunable optical filters for reducing bandwidths of the first tunable optical filter and the one or more second tunable optical filters, wherein the optical assembly is configured to adjust size of the collimated beams incident on the shared diffraction grating such that the bandwidths of the first tunable optical filter and the one or more second tunable optical filters are different, while the center wavelength and tuning range of the first tunable optical filter are common to the center wavelength and tuning range of the each of the one or more second tunable optical filters respectively.

9. The synchronous, tunable multi-optical filter system of claim 8, wherein the optical assembly is a beam expander comprising a pair of optical elements arranged to increase the size of the collimated beams.

10. The synchronous, tunable multi-optical filter system of claim 1, further comprising a rotation mechanism operably coupled to the shared rotatable optical component, wherein the rotation mechanism is configured to rotate the shared rotatable optical component for selecting the target wavelengths of the output beams.

11. The synchronous, tunable multi-optical filter system of claim 1, wherein the target wavelengths are in a tuning range from about 0.1 nanometers to about 9000 nanometers.

12. The synchronous, tunable multi-optical filter system of claim 1 configured to be integrated in a fiber laser system comprising a seed stage and one or more amplifier stages, for reducing amplified spontaneous emission noise generated in the seed stage and the one or more amplifier stages.

13. A method for synchronously tuning wavelengths of output beams in one of an optical system and an optoelectronic system, the method comprising:
 disposing a synchronous, tunable multi-optical filter system in the one of the optical system and the optoelectronic system, the synchronous, tunable multi-optical filter system comprising:
 a first tunable optical filter;
 one or more second tunable optical filters disposed at one or more predetermined locations proximal to the first tunable optical filter, wherein the first tunable optical filter and the one or more second tunable optical filters are configured to operate in individual communication modes;

a shared diffraction grating disposed in optical paths of both the first tunable optical filter and the one or more second tunable optical filters; and a shared rotatable optical component disposed at a predetermined distance from the shared diffraction grating;

receiving, by the shared diffraction grating, collimated beams from input elements of the first tunable optical filter and the one or more second tunable optical filters;

dispersing, by the shared diffraction grating, each of the received collimated beams into constituent wavelengths; and selecting target wavelengths from among the constituent wavelengths and communicating output beams having the target wavelengths to output elements of the first tunable optical filter and the one or more second tunable optical filters, by rotating the shared rotatable optical component, wherein by using the shared diffraction grating and by rotating the shared rotatable optical component, each of the one or more second tunable optical filters is tuned synchronously with the first tunable optical filter across a common tuning range such that a center wavelength of the first tunable optical filter substantially matches with a center wavelength of the each of the one or more second tunable optical filters.

14. The method of claim 13, wherein the shared diffraction grating is selected from one of a transmission grating and a reflection grating, and wherein the individual communication modes in which the first tunable optical filter and the one or more second tunable optical filters operate comprise a transmission mode and a reflection mode.

15. The method of claim 13, wherein the collimated beams are generated by collimating an optical beam received from an input source of each of the input elements of the first tunable optical filter and the one or more second tunable optical filters using an input collimator, and wherein the target wavelengths of the output beams are further tuned by an output collimator of each of the output elements of the first tunable optical filter and the one or more second tunable optical filters.

16. The method of claim 13, wherein the shared rotatable optical component is a reflection prism configured to separate the dispersed each of the collimated beams from the output beams and transmit the output beams having the target wavelengths to the output elements of the first tunable optical filter and the one or more second tunable optical filters in a transmission mode selected from the individual communication modes.

17. The method of claim 13, wherein the shared rotatable optical component is a mirror configured to reflect the output beams having the target wavelengths back to the input elements of the first tunable optical filter and the one or more second tunable optical filters in a reflection mode selected from the individual communication modes.

18. The method of claim 13, wherein the collimated beams are received through free space from an input source of each of the input elements of the first tunable optical filter and the one or more second tunable optical filters, wherein the input source is disposed in a free space optical connection to the shared diffraction grating.

19. The method of claim 13, further comprising adjusting size of the collimated beams incident on the shared diffraction grating such that bandwidths of the first tunable optical filter and the one or more second tunable optical filters are different, while the center wavelength and tuning range of the first tunable optical filter are common to the center wavelength and tuning range of the each of the one or more second tunable optical filters respectively, by disposing an optical assembly between the shared diffraction grating and the input elements of the first tunable optical filter and the one or more second tunable optical filters.

20. The method of claim 13, wherein the shared rotatable optical component is rotated by a rotation mechanism operably coupled to the shared rotatable optical component and shared by the first tunable optical filter and the one or more second tunable optical filters for selecting the target wavelengths of the output beams.

\* \* \* \* \*